US011948190B2

(12) United States Patent
Rostami et al.

(10) Patent No.: US 11,948,190 B2
(45) Date of Patent: *Apr. 2, 2024

(54) SMART LEARNING SYSTEMS FOR INTEGRATING AND LINKING MULTIPLE DATA ACCOUNTS ACROSS A NETWORK

(71) Applicant: Citizens Financial Group, Inc., Providence, RI (US)

(72) Inventors: Andrew Kamron Rostami, Weston, MA (US); Robert J. Sherman, Norwood, MA (US); Christina Elizabeth Sweeny, Chadds Ford, PA (US); Gaurav Sethi, Garnet Valley, PA (US); Scott Joseph Slagsvol, Beverly, MA (US); Rebecca Marie Hornbuckle, Boston, MA (US); Shaun Kevin Fisher, Natick, MA (US); Najmeh Mirzaie, East Boston, MA (US); Grace Elisabeth Nicklin, Somerville, MA (US)

(73) Assignee: Citizens Financial Group, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,241

(22) Filed: Nov. 3, 2022

(65) Prior Publication Data
US 2023/0070588 A1 Mar. 9, 2023

Related U.S. Application Data

(63) Continuation of application No. 17/160,664, filed on Jan. 28, 2021, now Pat. No. 11,526,934.
(Continued)

(51) Int. Cl.
*G06Q 40/02* (2023.01)
*G06Q 20/20* (2012.01)
(Continued)

(52) U.S. Cl.
CPC .............. *G06Q 40/02* (2013.01); *G06Q 20/20* (2013.01); *G06Q 20/24* (2013.01); *G06Q 20/36* (2013.01); *G06V 40/20* (2022.01)

(58) Field of Classification Search
CPC ........ G06Q 40/02; G06Q 20/20; G06Q 20/24; G06Q 20/36; G06V 40/20
(Continued)

(56) References Cited

U.S. PATENT DOCUMENTS 7,296,734 B2 11/2007 Pliha
9,740,977 B1 * 8/2017 Moon ...................... G06N 7/01
(Continued)

OTHER PUBLICATIONS

Google Scholar Search, dated Apr. 23, 2022. (Year: 2022).
(Continued)

*Primary Examiner* — Hai Tran
(74) *Attorney, Agent, or Firm* — Duane Morris LLP

(57) ABSTRACT

Data account management systems and methods are described. A server is in communication with one or more information source systems, at least one user device associated with at least one user and one or more electronic data accounts associated with the user. The server links the electronic data accounts, monitors data among the information source systems and the linked accounts for any changes in activity associated with the user, predicts a behavioral activity of the user via machine learning based on at least one of the monitored data and historical data associated with the user, identifies at least one notification instruction specific to the user based on the predicted behavioral activity, and generates an interactive graphical user interface (GUI) for display on the user device. The interactive GUI presents one or more of the notification instruction and a user profile of the at least one user among the linked accounts.

30 Claims, 7 Drawing Sheets

Related U.S. Application Data

(60) Provisional application No. 62/967,788, filed on Jan. 30, 2020.

(51) Int. Cl.
*G06Q 20/24* (2012.01)
*G06Q 20/36* (2012.01)
*G06V 40/20* (2022.01)

(58) Field of Classification Search
USPC .......................................................... 705/35
See application file for complete search history.

(56) References Cited

U.S. PATENT DOCUMENTS

| | | |
|---|---|---|
| 10,970,792 B1 | 4/2021 | Benkreira et al. |
| 11,120,512 B1 | 9/2021 | Dutt et al. |
| 2016/0314528 A1* | 10/2016 | Abbott ............... G06Q 30/0269 |
| 2018/0096372 A1* | 4/2018 | Rickard, Jr. ............. G06N 5/01 |
| 2019/0108585 A1 | 4/2019 | Caldwell |
| 2019/0259095 A1 | 8/2019 | Templeton |
| 2020/0184434 A1* | 6/2020 | Evans ................... G06Q 20/102 |
| 2020/0412817 A1* | 12/2020 | Ranjan ................... G06N 20/00 |
| 2021/0042723 A1 | 2/2021 | Walters et al. |

OTHER PUBLICATIONS

Google Patent Search, dated Apr. 23, 2022. (Year: 2022).
Google NPL (non-patent literature) Search, dated Apr. 23, 2022. (Year: 2022).

\* cited by examiner

SMART LEARNING SYSTEMS FOR INTEGRATING AND LINKING MULTIPLE DATA ACCOUNTS ACROSS A NETWORK

CROSS-REFERENCE TO RELATED APPLICATIONS

This application is a continuation application of U.S. patent application Ser. No. 17/160,664, filed Jan. 28, 2021, which claims priority to U.S. Provisional Patent Application No. 62/967,788, filed Jan. 30, 2020, which applications are incorporated herein by reference in their entirety.

TECHNICAL FIELD

The present disclosure generally relates to improving data structure management and, in particular, to management systems, interactive graphical user interfaces (GUIs) and methods for the integration, linking and management of multiple electronic data accounts customized to reflect monitored and predicted user activity.

BACKGROUND

Problems exist in the field of managing multiple electronic data structures, such as multiple electronic data accounts associated with a specific user. For example, electronic data accounts may be distributed across one or more networks, may be independently managed by different data management systems, may be specific to different entity systems, and/or may be associated with one or more of different security credentials (e.g., encryption/decryption keys, security question response, etc.), user identifiers (e.g., username, password, IP address, etc.), system parameters, data formats, data communication requirements, network security and the like. All of the above variables associated with multiple accounts make it technically difficult to identify and manage multiple independent accounts for a specific user.

Conventional data management systems do not manage electronic data accounts in consideration of user activity behavior particular to a specific user. Instead, conventional systems provide a uniform, non-user-customized approach to data account management. Moreover, because conventional data management systems independently manage electronic data accounts, these conventional systems are not aware of the existence of other data accounts associated with a same user. Accordingly, user activity that occurs in one account, due to user activity and which may affect another independent data account is not immediately detectable by conventional systems, if ever. This results in significant system redundancy (e.g., multiple systems managing/processing the same information, 'blind' processing-because one system is unaware of activities of the user via another independent account, etc.), downstream correction processing by one or more independent data management systems (e.g., to correct erroneous processing caused by a lack of awareness or connectivity to other independent accounts), etc.

In general, data management to customizing accounts for specific user activity behavior presents additional layers of difficulties and challenges that conventional systems are simply not equipped to handle. Let alone attempting to link and integrate independent data accounts. As a result, conventional systems are limited to providing fixed/uniform/ non-customized independent data account management strategies that have been pre-programmed into said systems. These pre-programmed data management strategies, however, have little to no variability or adjustability in respect of specific user activity behavior, that may vary over time, and that may affect multiple independent data accounts. As a result, pre-defined data account management strategies cannot easily be adapted to the specific individual user activity across multiple independent data accounts for the same user.

Accordingly, there is a need for a system (including a novel interactive graphical user interface (GUI)), and method for integrating, linking and managing of multiple electronic data accounts of a user that is customized to reflect monitored and predicted user activity and behavior in a fully-automated (or near fully-automated) and adaptive (e.g., machine-learning) manner. All of this, without significant increases to the computational burden, cost, system complexity, re-programming requirements and system maintenance.

SUMMARY

Aspects of the present disclosure relate to systems, methods and non-transitory computer-readable mediums providing data account management. A system includes one or more information source systems, at least one user device associated with at least one user, one or more electronic data accounts associated with the at least one user, and a server. The server is in communication with the one or more information source systems via at least one network, the at least one user device and the one or more electronic data accounts. The server is configured to link the one or more electronic data accounts, monitor data among the one or more information source systems and the linked accounts for any changes in activity associated with the at least one user, predict a behavioral activity of the at least one user via machine learning based on at least one of the monitored data and historical data associated with the at least one user, identify at least one notification instruction specific to the at least one user based on the predicted behavioral activity, and generate an interactive graphical user interface (GUI) for display on the at least one user device. The interactive GUI presents one or more of the at least one notification instruction and a user profile of the at least one user among the linked accounts.

DETAILED DESCRIPTION

Figure 1:
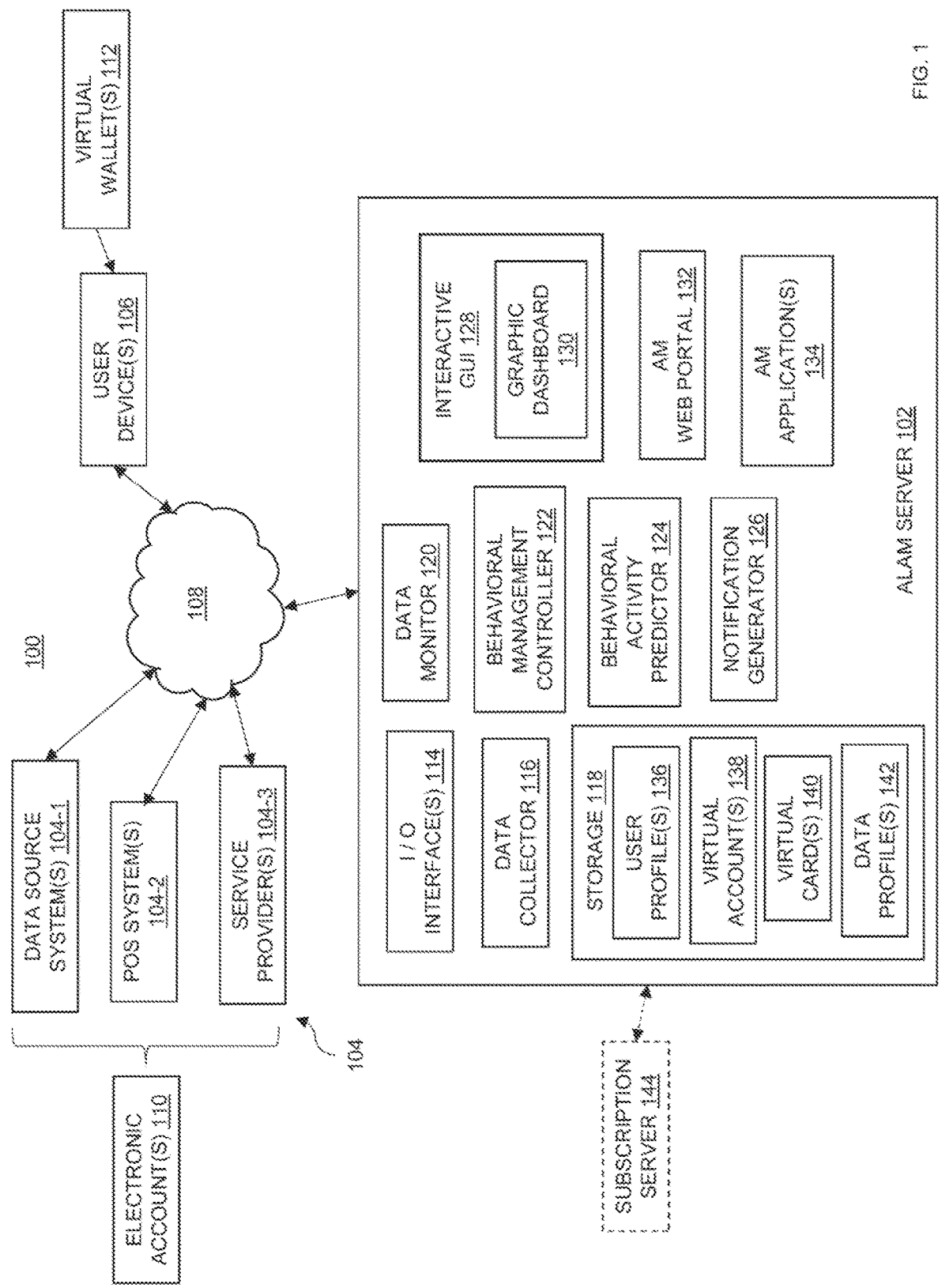
FIG. 1 is a functional block diagram of an example smart learning data account management system, according to an aspect of the present disclosure.

The present disclosure is related to a smart/learning system that integrates and links multiple systems and/or accounts across a network, captures historic and real-time activity and data, and intelligently (e.g., through machine learning) generates automated notifications, suggestions and graphic presentations. Access to the entire system (and/or aspects thereof) may be granted, in some examples, on a subscription basis, wherein different subscription tiers may unlock/grant access to various features and functions of said system. In an exemplary implementation, the system is accessible via a user's mobile communication device, although it may also be accessible via other types of devices.

In summary, the system described herein comprises a network of systems and/or accounts, all of which are in communication with one or more central main server(s) of the system of the present disclosure. The system is configured to generate a unique interactive graphic user interface (GUI) that receives as input historic, current (real-time) and/or forward-looking data and information. The input may be received via user selection/entry and/or directly (e.g., data extraction, interrogation of external data sources, etc.) via communication links to the other systems/accounts in the network. Receipt of this input may then trigger one or more automated routines that generate, for example, a profile reflective of the user's past, current and/or projected future activity. Alternatively, automated routines may be triggered to generate a dynamic profile of live market data activity, credit score, relevant offers, automated notices, product offerings, etc.

The system may also trigger routine(s) to automatically generate a graphic presentation of the profile(s) and/or related data and information (e.g., a graphic dashboard). The graphic presentation may itself be interactive, insofar as selection or manipulation of various elements of the graphic presentation may trigger the launch of additional routines providing additional presentations and/or functionality. In addition, the graphic presentation may be configured to automatically update, based on real-time changes to data that may affect the overall profile(s) (e.g., changes to interest rate data, new purchase activity, updated credit score, etc.), so as to provide a dynamic up-to-date presentation. The graphic presentation may also simultaneously display information from multiple systems/accounts, all on a single screen.

Incorporated into the system is a learning engine that implements machine learning technology to automatically initiate certain functions and notifications based on data and information gathered, input and/or received by the system. For example, the learning engine may track historic activity to predict future activity, and then generate notices, alerts or suggestions. To illustrate, the system may monitor point-of-sale purchase activity and automatically initiate, based on a predetermined type of purchase, a routine to offer access to features of the system, including a membership and/or a subscription enhancement. This routine may present offers, notices, products, suggestions, etc. via an electronic communication (e.g., email, text, in-app notification, etc.), and acceptance of one or more offers, for example, (e.g., via the interactive GUI, responding to electronic communication, etc.) may trigger the system to automatically generate/activate a new virtual account that is pushed into and accessible via a virtual wallet, for example. Activities initiated by this new virtual account may then automatically be integrated into a user's overall profile, which may be dynamically updated and displayed via the systems graphic presentation. Additional details and aspects of the system of the present disclosure are provided below.

The smart/learning system of the present disclosure also provides technical advantages that do not exist in prior art systems. For example, in some embodiments, the system of the present disclosure may be configured to provide a user-centric installment payment experience for users, including the ability to pay for large purchases over time and/or via multiple accounts (e.g., draw partial payments from different accounts to minimize interest, open a new credit account, etc.) in a manner that may smooth out (e.g., level) their monthly cash flow (e.g., to maintain a stable cash flow with minimal variability). In some examples, the system may be merchant agnostic. In some examples, the system may be configured as a transparent (e.g., may provide no surprises or penalties, unclear terms and fees) membership product with a revolving credit that may be accessed for multiple large purchases and may provide a clear monthly repayment schedule to help budget any spending.

In some examples, the smart/learning system may include an integrated platform that may provide an open loop architecture. In this manner, the system may allow users to integrate their accounts from multiple financial entity systems (which accounts may be independently managed by the respective entity systems). Accordingly, the system does not restrict users to account data from only one financial entity system or one type of account. Rather, the system is configured to integrate multiple types of accounts from among with multiple financial entity systems.

The smart/learning system of the present disclosure may also provide ease of integration with data providers, such that the system may link to the data providers and gather data and/or information throughout a lifecycle of user accounts managed by the system. The system may also be configured to build a framework that uses the latest (e.g., real-time/most up-to-date) data, train and build models, build alerts and communicate with the user in real-time and/or near-real-time, with minimal effort from the user.

The smart/learning system may also gather transaction information across multiple payment instruments and may consolidate (e.g., aggregate) the transaction information for presentation on an interactive GUI, to improve the ease of the user to review the consolidated information, and also to provide the user with the ability to create one or more payment plans.

The smart/learning system, in some examples, may provide users with an option, via the interactive GUI, to create a line of credit. The line of credit may be used, for example, to make multiple payment plans where the pricing for one or more transactions may be created using multiple frameworks (e.g., subscription pricing, fixed rates, risk based rates, rates based on the amount of the transaction(s), etc.).

The smart/learning system, in some examples, may use data gathered from multiple information systems (e.g., financial entity systems) to learn the spending patterns of the user, and may thus identify typical income and expense levels and periods of higher expenses. Based on the learned information (i.e., the behavioral activity of the user), the system may provide suggestions to level (e.g., smooth) expenses and may determine a buffer specific to the user (that may also be customizable by the user), to accommodate for some of the expenses in a cost effective manner.

The smart/learning system may, in some samples, include a communication platform that may package data among linked accounts of the user and may communicate information about the linked accounts as insights. The packaged data (e.g., insights) may include, without being limited to, personalized notices, alerts that align with the user activities and/or spending habits. In some examples, the system may build one or more product offerings and/or may suggest specific features or products. The suggestions and created product offering may be based on monitoring of the spending habits of the user, as well as an annual income, an amount of a buffer, one or more categories of activities and/or how others with a similar profile spend and/or repay debt (e.g., suggestions based on "people like me").

The smart/learning system may include an artificial intelligence (AI) component for learning and predicting the behavioral activity of the user. The AI component is an important element in the system of the present disclosure, for creating value added services (including user-customized management of the user's accounts, including for expected and unexpected expenses). The AI component may be used to manage user access and unlock one or more features and functionality of the system that may be useful for the user. In some examples, the AI component may be used for ingesting data from multiple sources, creating models, identifying opportunities for the user, proactively alerting the user and providing guidance to the user to help the user spend and/or repay responsibly. In some examples, the AI component may provide opportunities where the user can save and may be provided with a reward (e.g., as a positive reinforcement).

The AI component may be used to create automated routines triggered on changes in data such as market data, credit score, etc. and may help provide relevant offers, promotions, product offerings and/or automated alerts personalized for the user. The AI component may be used to analyze user patterns and to build one or more recommendation systems, for example, for benchmarking and/or to create recommendations according to personas ("people like me"). The AI component may, as a result of extensive modeling, provide an improved customizable financial and planning tool that may provide benefits to users as described herein.

The system of the present disclosure, as described herein, overcomes significant technical and systematic problems to produce a platform that provides user-customized suggestions and linked account information, including based on real-time and/or near-real-time data, for multiple independent electronic accounts across one or more networks where the accounts may be managed by different entity systems. For example, the integration of data from external data sources with internal systems to gather information so as to get a 360-degree view of the user's activity/profile is a technical problem requiring a technical solution. Technical challenges also exist with adding a layer of additional data from external data sources through integration with one or more data aggregators to gather external data (e.g., data related to financial entity systems, business entity systems, credit agency systems, user devices and the like). Still further, technical challenges also exist in the creation of a user interface (UI) and a user experience (UX) flow that provides a simple interface for the user, where the UI/UX may connect to data providers, ingest data, create relevant information for the user, allow the user to personalize the experience, and provide communication to the user based on the latest data in real-time and/or near-real-time. The UI/UX flow of the present disclosure helps the user to navigate easily, receives relevant information for decision-making and provides a personalized graphic dashboard that captures past and current data to inform future (predicted) options to manage the user's specific expenses and spend effectively. Building an AI component as described herein that can manage multiple data sources and information and provide a simple interface that can be customized to the needs of the user provides a technical solution to technical problems noted herein.

Referring now to FIG. 1, a functional block diagram of an example smart learning data account management system 100 (system 100 herein) for integrating, linking and managing multiple independent electronic data accounts of at least one specific user is shown. System 100 may include central activity-learning account management (ALAM) server 102, one or more information systems 104 and one or more user devices 106 (associated with at least one user). One or more independent electronic accounts 110 of at least one user may be associated with one or more among information system(s) 104. In some examples, one or more virtual wallets 112 may be associated with and/or generated (e.g., by server 102) for the at least one user (e.g., associated with user device(s) 106). In some examples, system 100 may include optional subscription server 144 communicatively coupled to ALAM server 102.

In some examples, one or more components of system 100 (e.g., ALAM server 102, information system(s) 104, user device(s) 106, electronic account(s) 110, virtual wallet(s) 112 and/or optional subscription server 144) may be communicatively coupled via one or more communication networks 108. Communication network(s) 108 may include, for example, a private network (e.g., a local area network (LAN), a wide area network (WAN), intranet, etc.) and/or a public network (e.g., the Internet).

In some examples, ALAM server 102 may communicate with, without being limited to, information system(s) 104 (such as one or more data source systems 104-1), electronic account(s) 110 associated with the at least one user, virtual wallet(s) 112 associated with the at least one user, and user device(s) 106 associated with the at least one user (which may include, in some examples, subscribers and/or other entities who may potentially subscribe to system 100).

Information system(s) 104 may include, without being limited to, one or more data source system(s) 104-1, one or more point-of-sale (POS) systems 104-2 and/or one or more service providers 104-3. In general, information system(s) 104 may provide user information, financial and/or interest rate data that may represent historical, current and/or projected future data. In some examples, the data that is provided by information system(s) 104 may include data specific to a particular user and/or data that is independent of a particular user (e.g., a current interest rate in a marketplace). In general, information system(s) 104 that may be in communication with ALAM server 102 may comprise a server computer, a desktop computer, a laptop, a smartphone, a tablet, or any other electronic device known in the art configured to capture, receive, store and/or disseminate any suitable data.

In some examples, data source system(s) 104-1 that are in communication with ALAM server 102 may include, without being limited to, financial institution systems (e.g., a bank entity, a loan service, etc.), business entity systems (such as a utility company, a telecommunications company, etc.), government entity systems (e.g., federal agencies, state government agencies, etc.), credit agency systems, other users/systems, and/or any suitable source of data and/or information.

POS system(s) 104-2 that may interact with ALAM server 102 may comprise any point of sale (POS) device or system (e.g., embodied as a terminal including hardware and software and/or a software-based system on a mobile communication device for processing card payments at retail locations) for accepting payment of transactions from users (e.g., via user devices, payment cards, virtual cards, virtual wallets and/or cash transactions). POS system(s) 104-2 may also correspond to physical places of business (e.g., stores) and/or one or more online websites.

Service provider(s) 104-3 that may interact with ALAM server 102 may comprise any service provider system (e.g., embodied as a computer server including hardware and software) for providing one or more services to users. Examples of service providers include, without being limited to, a healthcare provider, a financial services provider, and the like. Typically, a user may use services provided by a service provider or may subscribe to a service provider to access services offered by the service provider.

User device(s) 106 may include, without limit, any combination of mobile and/or stationary communication device such as mobile phones, smart phones, tablets computers, laptop computers, desktop computers, server computers or any other computing device configured to capture, receive, store and/or disseminate any suitable data. In one embodiment, user device(s) 106 may include a non-transitory memory, one or more processors including machine readable instructions, a communications interface which may be used to communicate with ALAM server 102, a user input interface for inputting data and/or information to user device(s) 106 and/or a user display interface for presenting data and/or information on user device(s). In some examples, the user input interface and the user display interface may be configured as a graphical user interface (GUI) (such as interactive GUI 604 shown on display interface 602 shown in FIG. 6). User device(s) 106 may also be configured to provide interactive GUI 128 of ALAM server 102 on the GUI of user device(s) 106. In some examples, user device(s) 106 may include computer system 700 (shown in FIG. 7).

In general, electronic account(s) 110 of system 100 may be stored as electronic records on one or more suitable electronic devices (e.g., a server computer, a cloud computing system, a desktop computer, a laptop, a smartphone, a tablet, etc.). In some examples, electronic account(s) 110 may be stored in secured storage. In some examples, electronic account(s) 110 may be stored on one or more electronic devices that are external to ALAM server 102. In other examples, electronic account(s) 110 may represent multiple independent data accounts, each associated with a same specific user, and that correspond to different entities and/or sub-entities among information system(s) 104. The multiple data accounts (associated with a same specific user) may be independent insofar as the data accounts are not linked together and/or are managed independently by the corresponding information system 104.

Virtual wallet(s) 112 (also referred to as digital wallets) may exist on one or more electronic devices and/or one or more online service systems that securely stores payment information and passwords of a user for one or more payment methods and/or one or more websites. In some examples, virtual wallet(s) 112 may be used in conjunction with one or more POS system(s) 104-2, such as mobile payment systems (e.g., for payment of purchases with a smartphone). In some examples, virtual wallet(s) 112 may also store loyalty card information and/or digital coupons.

ALAM server 102 may include one or more input and/or output interfaces 114 (collectively referred to herein as I/O interface(s) 114), data collector 116, storage 118, data monitor 120, behavioral management controller 122, behavioral activity predictor 124, notification generator 126 and interactive GUI 128 configured to present a graphic dashboard 130. In some examples, ALAM server 102 may include one or more of account management (AM) web portal 132 and one at least one AM application 134. In some examples, one or more components 114-134 of ALAM server 102 may communicate with each other via a data and control bus (not shown). Although ALAM server 102 is shown in FIG. 1 as one server, ALAM server 102 may include one or more servers, whether co-located or linked across one or more networks.

In some examples, ALAM server 102 may obtain data and/or information from among information system(s) 104 and/or electronic account(s) 110 via data collector 116 and I/O interface(s) 114. I/O interface(s) 114 may include one or more input and/or output interfaces (e.g., an electronic device including hardware circuitry, an application on an electronic device) for communication with other components of system 100 (e.g., information system(s) 104, electronic account(s) 110, user device(s) 106, virtual wallet(s) 112, optional subscription server 144, etc.).

Data collector 116 may be configured to obtain data and information (via I/O interface(s) 114) through any suitable electronic data collection technique. For example, data collector 116 may obtain data through or more live data feeds, one or more file transfers (including, in some examples, one or more secure file transfers), by data being pushed to ALAM server 102 and/or by ALAM server 102 pulling and/or extracting data and/or information from among information system(s) 104, electronic account(s) 110, user device(s) 106 and/or virtual wallet(s) 112. In some examples, data collector 116 may also filter, parse and/or aggregate the obtained data. In some examples, data collector 116 may include security protection to protect the integrity of the obtained data. An example of data collector 116 is described further below with respect to FIG. 2.

Although not shown, ALAM server 102 may include at least one processor (e.g., processing device 702 shown in FIG. 7) and non-transitory memory (e.g., memory 706 shown in FIG. 7) storing one or more routines and or algorithms (e.g., machine learning algorithms) for performing the functions of ALAM server 102 described herein. An example implementation of one or more components of ALAM server 102 is shown by computer system 700 (shown in FIG. 7).

In some embodiments, ALAM server 102 may include storage 118 (e.g., one or more databases) for storing data and/or information associated with the various functions of ALAM server 102. Storage 118 may be configured to store one or more user profiles 136, one or more virtual accounts 138, one or more virtual cards 140 and one or more data profiles 142. Storage may also be configured to store any parameters, functions and/or other suitable information that may be useful for one or more of components 114-134. Storage 118 may also be configured to store information for information system(s) 104, electronic account(s) 110 and/or virtual wallet(s) 112 (e.g., data security, data format, normalization, any network identifiers, geolocation(s), etc.). In general, storage 118 may be configured to store any suitable information associated with information system(s) 104, user device(s) 106, electronic account(s) 110, virtual wallet(s) 112, that may be useful for data collector 116, data monitor 120, behavioral management controller 122, behavioral activity predictor 124, notification generator 126, interactive GUI 128, AM web portal 132, AM application(s) 134 and optional subscription server 144.

In some examples, it may be desirable for the data of each information system 104, associated users, electronic accounts 110 and virtual wallet(s) 112 to be segregated in a secure manner, and for each information system 104 to only access their own data. Accordingly, ALAM server 102 may utilize one or more data access security mechanisms, in addition to applying data encryption that may employ, for example, individualized encryption keys and strings for each information system 104.

User profile(s) 136 may include a dynamic profile of a specific user's activity (e.g., a profile reflective of the user's past, current and/or projected future activity). In a non-limiting example, user profile(s) 136 may include an annualized/monthly income, spending information, buffer information between spending and income (e.g., a buffer over various time periods such as six months, twelve months, etc.) and the like. In some examples, user profile(s) 136 may also include, without being limited to, one or more of additional user information (e.g., personal information, account information (e.g., account number(s), linking information, etc.), login information for one or more accounts (e.g., user name(s), user password(s), etc.), virtual wallet information, network identifier(s), user device information, geolocation(s) and the like. In general, user profile(s) 136 may include any suitable data and information associated with a specific user that may be useful for learning, predicting and dynamically updating the user's activity, for managing the user's virtual account(s) 138, external electronic account(s) 110 and interacting with the user's virtual wallet(s) 112. User profile(s) 136 are dynamic in that information in user profile(s) 136 may be updated in real-time and/or near real-time by behavioral management controller 122 based on monitoring of data and information associated with the specific user and/or other live data by data monitor 120.

Virtual account(s) 138 may include one or more internal data accounts, associated with a specific user, that may be created and managed by ALAM server 102. In some examples, virtual account(s) 138 may be virtual in the sense that virtual account(s) 138 may be created and managed by ALAM server 102 (e.g., rather than by information system(s) 104), and may be data account(s) that are separate from (external) electronic account(s) 110. In some examples, virtual account(s) 138 may be linked to one or more electronic account(s) 110 and/or may integrate at least a portion of data from among electronic account(s) 110 associated with a specific user.

In some embodiments, virtual account(s) 138 of a specific user may be used to initiate activities (e.g., make a purchase, initiate a loan, initiate a service, etc.), similar to activities initiated with electronic account(s) 110. For example, a new virtual account 138 may be activated and pushed to virtual wallet(s) 112 of the specific user. In another example, activities initiated by the new virtual account 138 may then automatically be integrated into a user's overall user profile 136, which may be dynamically updated and, in some examples, displayed (e.g., via interactive GUI 128).

In some examples, virtual account(s) 138 may be created and activated by behavioral management controller 122. For example, virtual account(s) 138 may be created in response to monitoring of data by data monitor 120 and/or user activity as determined by behavioral activity predictor 124 (e.g., changes in real-time data, historic user activity, current user activity, predicted user activity and the like). In some examples, a virtual account 138 may be created by ALAM server 102 and automatically activated (e.g., based on one or more predetermined activation parameters predefined by ALAM server 102 and/or a specific user). In some examples, a virtual account 138 may be created by ALAM server 102 and a prompt requesting activation of the new virtual account 138 may be transmitted to the specific user. For example, a prompt such as a text message, an email, etc. may be sent directly to user device(s) 106. As another example, a prompt requesting activation may be displayed on interactive GUI 128. ALAM server 102 may then activate the virtual account 138 responsive to user input confirming the activation.

One or more virtual cards 140 may be created (e.g., by behavioral management controller 122), such as by digital wallet technology, for example, to link (internal) virtual account(s) 138 and (external) electronic account(s) 110. For example, ALAM server 102 may issue a virtual card number and push the virtual card number to a virtual wallet 112 of choice of the user (e.g., Apple Pay®, Samsung Pay®, etc.). In some examples, the virtual card number may be linked to one or more separate virtual account(s) 138 (e.g., such as a line of credit). In some examples, virtual card(s) 140 and virtual account(s) 138 may be created as part of an accessible service level and/or subscription in accordance with optional subscription server 144. In some examples, activity of the separate line of credit (e.g., virtual account(s) 138) may be incorporated into an overall spending strategy generated by ALAM server 102. In some examples, virtual card(s) 140 may also be used as an installment loan (e.g., a monthly loan) within the line of credit rather than as a credit card.

Data profile(s) 142 may include one or more dynamic profiles of other data and information that may be relevant to managing electronic account(s) 110. Non-limiting examples of data profile information may include live market data activity, one or more credit scores, relevant offers (e.g., that may improve management of one or more of electronic account(s) 110), automated notices, product offerings, etc. In general, data profile(s) 142 may include any suitable data and information that may also be useful for learning, predicting and dynamically updating the user's activity and/or for managing the user's virtual account(s) 138, external electronic account(s) 110. Data profile(s) 142 are dynamic in that information in data profile(s) 142 may be updated in real-time and/or near real-time by behavioral management controller 122 based on monitoring of data and information by data monitor 120.

Data monitor 120 may be configured to monitor data collected by data collector 116 from among one or more of information system(s) 104, electronic account(s) 110, user device(s) 106, virtual wallet(s) 112, etc. Data monitor 120 may also monitor any activity on virtual account(s) 138 and/or virtual card(s) 140. In some examples, data monitor 120 may detect user activity and/or other data that meet one or more predetermined criteria. For example, data monitor 120 may detect a purchase by the user at one or more of POS system(s) 104-2. As another example, data monitor 120 may detect a change in an interest rate that may be useful for managing virtual account(s) 138 and/or electronic account(s) 110. Data monitor 120 may transmit any data that meets the predetermined criteria to behavioral management controller for further processing.

Behavioral management controller 122 may be configured to receive monitored data from data monitor 120, as well as user input associated with a specific user from interactive GUI 128. Behavioral management controller 122 may also communicate with behavioral activity predictor 124 and may receive predicted behavioral activity of the specific user from behavioral activity predictor 124. Based on the received information (e.g., monitored data, user input, predicted behavioral activity, etc.), behavioral management controller 122 may be configured to create, manage and dynamically update user profile(s) 136, virtual account(s) 138, virtual card(s) 140 and data profile(s) 142. Behavioral management controller 122 may also be configured to control storing of data collected by data collector 116 in storage 118. In some examples, behavioral management controller 122 may also be configured to manage data among (external) electronic account(s) 110 and (internal) virtual account(s) 138.

In some examples, behavioral management controller 122 may also be configured to identify at least one of an alert and an action specific to the at least one user based on historical, current and/or predicted behavioral activity (e.g., as determined by behavioral activity predictor 124). Behavioral management controller 122 may be configured to generate user-specific notification instructions including the alert(s) and/or action(s), and to transmit the notification instructions to notification generator 126. In some examples, behavioral management controller 122 may be configured to control the data and information displayed and updated on interactive GUI 128. In general, information provided by behavioral management controller 122 to user device(s) 106 (e.g., alert(s), action(s), displayed information on interactive GUI 128) may be associated with the management (e.g., creation, updates, integration, etc.) of electronic account(s) 110 (and, in some examples, virtual account(s) 138 and/or virtual card(s) 140) of the specific user that may take into account the user's historical, current and/or predicted behavioral activity.

In some examples, behavioral management controller 122 may include a processor, a microcontroller, a circuit, software and/or other hardware component(s). In general, behavioral management controller 122 may include one or more one or more routines (i.e., computer readable instructions executed on at least one processing device) for managing data accounts, determining the specific notification instructions and presentation of data and information on interactive GUI 128. It may be appreciated that the routines of behavioral management controller 122 may depend upon a specific application of system 100. In a non-limiting example described further below, system 100 may be used for managing financial funding of electronic account(s) 110 to improve the leveling of expenses across the user's electronic account(s) 110 that considers the user's typical and atypical expenses. In some examples, system 100 may be used to help users understand how to spend more responsibly, based on the users' actual habits (e.g., according to the users' historical and current information across multiple accounts), minimize interest on repayments, and, in some examples, may predict future habits specific to each user.

An example of behavioral management controller 122 is described further below with respect to FIG. 3.

Behavioral activity predictor 124 may be configured to receive data and information associated with a user and learn one or more patterns and/or activity behavior regarding the user. In some examples, behavioral activity predictor may also obtain other data and/or information (e.g., data not directly associated with the user, data that is independent of the user, etc.). In some examples, behavioral activity predictor 124 may receive data and information, for example, from among one or more of user profile(s) 136, virtual account(s) 138, virtual card(s) 140, data profile(s) 142, electronic account(s) 110, information system(s) 104, user device(s) 106, virtual wallet(s) 112, data monitor 120 and behavioral management controller 122. In some examples, behavioral activity predictor 124 may determine pattern(s) and/or behavior via one or more machine learning algorithms. In general, behavioral activity predictor 124 may learn a pattern(s) and/or behavior of a user based on one or more of backward looking information (e.g., historical activity of the user), current information and future predictions. Behavioral activity predictor 124 may provide user-specific learned behavior information to behavioral management controller 122.

An example of behavioral activity predictor 124 is described further below with respect to FIG. 3.

In some examples, behavioral management controller 122 and behavioral activity predictor 124 may also be collectively referred to as an AI engine. In general, the AI engine (e.g., AI engine 300 shown in FIG. 3) may be configured to obtain input data that may include static and/or dynamic (i.e., changing) data and/or information. For example, the input data may include user input (e.g., via interactive GUI 128), data from information system(s) 104, data from electronic account(s) 110, data from user device(s) 106, data from virtual wallet(s) 112, data from storage 118 and the like. In one non-limiting example, the AI engine may identify one or more service levels associated with a user (e.g., service level(s) to which a user may have access). For example, the AI engine may automatically determine service(s) levels accessible by the user based on one or more predetermined parameters (e.g., user income level, user geolocation, etc.), based on a subscription of the user to particular service level(s) and the like. As discussed above, the AI engine may generate behavioral activity predictions specific to a user. Based on the behavioral activity predications and the service level(s) accessible to the user, the AI engine may use the user's linked accounts (as well as any other suitable data/information) to create one or more outputs and package the output(s) for presentation and interaction with the user. The packaged data may include, without being limited to, one or more of product offers, notices, alerts, benchmarking information, suggestions and/or advice, and integration options to other systems (e.g., links to one or more internal systems and/or external systems). The packaged data (e.g., an alert) may be transmitted to user device(s) 106 as an electronic communication (e.g., email, a text message such as a short message service (SMS) message, etc.) and/or the packaged data may be provided to graphic dashboard 130 for presentation/user interaction on interactive GUI 128. In some examples, the output(s) generated by the AI engine (e.g., in accordance with service level(s) associated with the user) may be packaged to communicate personalized insights about the user's linked accounts (such as personalized notices, alerts and the like) that may align with the behavior activities and spending habits of the specific user. The user may then, in response to the AI engine outputs (e.g., via interactive GUI 128), provide responsive input to initiate one or more suggestions generated by the AI engine.

Notification generator 126 may be configured to receive user-specific notification instructions from behavioral management controller 122, and may provide one or more automated notification indications of action(s) and/or alert(s) to user device(s) 106. In some examples, the automated notification indication(s) may be transmitted to user device(s) 106 as any suitable electronic communication (e.g., a text message, an email and the like). In some examples, the automated notification indication(s) may be presented on interactive GUI 128. In some examples, the automated notification indication(s) may be both transmitted as an electronic communication and presented on interactive GUI 128. In general, the automated notification indication(s) may be provided via email, text messages, on interactive GUI 128 (e.g., via one or more webpages of AM web portal 132 and/or via AM application(s) 134) or any suitable form of electronic communication. In some examples, the automated notification indication(s) may include suggested actions to take based on predictive behavior determined by ALAM server 102 (e.g., refinance so you have funds for upcoming spend, your income is too close to spend further therefore you may want to refinance) and/or alerts based on changes in currently monitored information systems 104 (e.g., interest rates have dropped, your credit score has improved, etc.). In some examples, automated notification indication(s) may be transmitted to one or more third parties (not shown).

Interactive GUI 128 may be configured to generate graphic dashboard 130 having a uniquely configured arrangement of one or more user input regions, one or more notification indication(s) regions, and one or more display regions. In some examples, one or more portions of graphic dashboard 130 may be automatically updated (including in real-time or near real-time), responsive to changes in information and data (e.g., as determined by behavioral management controller 122). In some examples, the display region(s) may include an interactive display that permits/prompts user input and may be automatically updated in response to user input.

An example of interactive GUI 128 is described further below with respect to FIG. 6.

In general, graphic dashboard 130 of interactive GUI 128 may receive one or more user inputs (e.g., from user device(s) 106) and may be configured, via behavioral management controller 122, to update graphic dashboard 130 in accordance with the user input, as well as based on monitored data (via data monitor 120) and/or any user-specific learned behavior (as determined by behavioral activity predictor 124). In some examples, behavioral management controller 122 (via notification generator 126) may automatically update graphic dashboard 130 based on monitored data (via data monitor 120) and/or any user-specific learned behavior (as determined by behavioral activity predictor 124), without any direct user input to interactive GUI 128. For example, behavioral management controller 122 may identify a notification instruction (e.g., alert(s) and/or action(s)) based on predicted behavioral activity of the user, in response to monitored data.

As noted above, the inputs into interactive GUI 128 may trigger one or more processing actions by ALAM server 102. For example, one or more automated routines of ALAM server 102 may be triggered by interaction with graphic dashboard 130 of interactive GUI 128 (e.g., submission/extraction of data from among one or more information system(s) 104 electronic account(s) 110, virtual wallet(s) 112, virtual account(s) 138 and virtual card(s) 140, defining and updating user profile(s) 136, etc.). Graphic dashboard 130 of interactive GUI 128 may further be configured to provide one or more automated notification indications (via notification generator 126) that may be shown to user device(s) 106. In some examples, the automated notification indication(s) may include predictive behavior-based suggestions (e.g., you spend a lot in December, start saving in June, etc.).

Non-limiting examples of user inputs that may be received by interactive GUI 128 may include links to one or more bank accounts of the user, one or more credit card accounts, one or more checking accounts, one or more virtual accounts (e.g., blockchain account), an income level, expenditures (e.g., large expenditures over a time period), planning parameters (e.g., for a planning tool), credit score, etc. In some examples, a planning tool feature of ALAM server 102 may consider backward looking information (e.g., income, past large expenses, other historic information) for future planning. Interactive GUI 128 may prepopulate one or more portions of this information on graphic dashboard 130, for example, based on links to the user's electronic account(s) 110. In some examples, one or more portions of the information may be manually entered (e.g., via user device 106) or automatically updated from electronic account(s) 110 in real or near real time.

Figure 6:
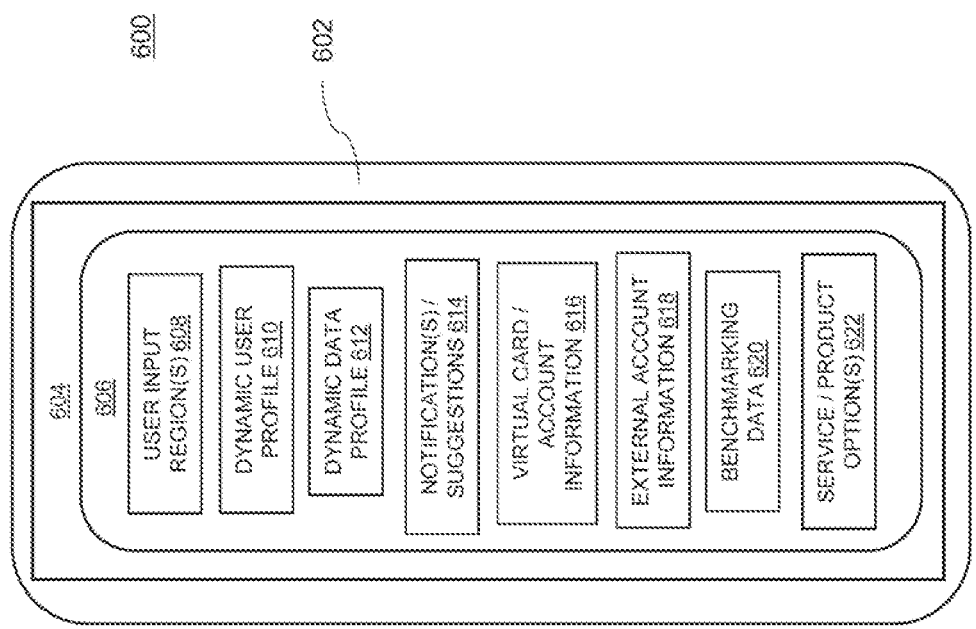
FIG. 6 is an illustration of an example interactive GUI on a user device for user-customized data account management, according to aspects of the present disclosure.

Interactive GUI 128 may be configured to generate a presentation of various types of information, various quantities of information aggregated from different systems/data sources (e.g., information systems(s) 104) and/or various functions accessible via a display screen of user device(s) 106, for example, display interface 602 of user device 600 shown in FIG. 6). For example, interactive GUI 128 may be configured to provide a simultaneous display of multiple accounts, live updates to spending on a single display, live credit score information, live interest rate data, etc. In some examples, ALAM server 102 may connect to one or more separate banking accounts, credit card accounts, credit bureaus, live market data, income source/payroll providers (e.g., which may provide pre-deposits into checking accounts), student loan departments, government entities and/or private entities (e.g., a university to identify education level), etc. to generate the presentation(s) on graphic dashboard 130.

In some examples, interactive GUI 128 may be accessible to user device(s) 106 and may be presented on a display of user device(s) 106 via one or more web pages of AM web portal 132. In some examples, interactive GUI 128 may be accessible to user device(s) 106 and may be presented on a display of user device(s) 106 via AM application(s) 134.

In a non-limiting example, AM application(s) 134 may include a 'spending responsibly' application (app), that may provide links to users' electronic account(s) 110, and may show various indicators that may help users understand how to spend more responsibly, based on the users' actual habits (e.g., according to the users' historical and current information across multiple accounts), and, in some examples, may predict future habits specific to each user (e.g., via behavioral activity predictor 124). In one illustrative example, the indicators may include an income level (e.g., based on monitoring a particular user's checking account), an expense level and a buffer between the particular user's income level and expense level (e.g., on a monthly basis). The income level may be a more constant value, whereas the expense level may be more volatile (e.g., may vary based on seasonality (e.g., holiday spending), unexpected purchases or expenses, travel, etc.). ALAM server 102 (e.g., via behavioral activity predictor 124) may learn and identify typical expense levels and more volatile periods of higher expenses, and behavioral management controller 122 (via notification generator 126) may provide automated suggestions for leveling out the expenses, such as access to installment loans (e.g., which may be interest free loans). In some examples, the suggestions for leveling expenses, may be useful for cases such as expected and/or unexpected travel expenses, personal expenses, home expenses, etc.

In some examples, ALAM server 102 may include optional subscription server 144. Subscription server 144 may provide a subscription-based service/member-based access to one or more features and functions of ALAM server 102. Subscription server 144 may interact with interactive GUI 128, and may provide one or more registration regions and/or screens on graphic dashboard 128 for user registration and user login to one or more subscription services provided by subscription server 144. In some examples, subscription server 144 may provide a value proposition, where various subscription levels may unlock access to various features of ALAM server 102.

In operation, in some examples, data monitor 120 of ALAM server 102 may proactively monitor the user's activity across one or more various accounts (e.g., electronic account(s) 110, virtual account(s) 138). For example, data collector 116 of ALAM server 102 may create links to the various electronic account(s) 110, and may extract information from electronic account(s) 110 (e.g., spending, income, extraordinary activity, etc.), by monitoring the linked accounts. Data collector 116 of ALAM server 102 may aggregate the collected information, and behavioral management controller 122, via interactive GUI 128, may provide user device(s) 106 with notices, insights, products and/or alerts that line-up with the user's user profile(s) 136 and activity. In some examples, based on the user's demographics, ALAM server 102, via interactive GUI 128, may provide spending insights to the user (via user device(s) 106) for a representative user with similar demographics (e.g., typical spending habits for "people like me").

By linking account information for the user and with the incorporation of behavioral activity predictor 124, as discussed above, ALAM server 102 may be able to "learn" information specific to each user, predict habits of the user, predict possible problems/deficiencies, and suggest and/or provide features and/or products specific to the user (including, in some examples, based on a subscription level) to avoid any such problems/deficiencies.

In some examples, ALAM server 102 may generate automated notification indication(s) by learning patterns and/or a behavior of a user based on one or more of backward looking information, current information and future predictions. The patterns/behavior of a user may be determined by behavioral activity predictor 124 via one or more machine learning algorithms. In some examples, the notification indication(s) (via notification generator 126) may represent smart alerts and suggestions through the ability of ALAM server 102 to learn the user's behavioral habits. In some examples, the automated notification indication(s) may include suggestions directed to the user from the perspective of 'people like you.' It should also be noted that the type, frequency and category of alerts, notifications, suggestions, actions, etc. generated by the ALAM server 102 and provided and/or presented to the user may be regulated and/or moderated by the user (e.g., parameters included in the user's profile).

In some examples, user input, via interactive GUI 128, may include a grant of authorization to ALAM server 102 to access the user's electronic account(s) 110. The authorization may then be used by data collector 116 of ALAM server 102 to establish a link among electronic account(s) 110. In some examples, the user may already include at least one account that is linked to a product/service associated with ALAM server 102 (e.g., virtual account(s) 138 and/or virtual card(s) 140). In this example, the authorization received by interactive GUI 128 via the user input may cause ALAM server 102 to prepopulate information (e.g., in storage 118, presented by interactive GUI 128) for triggering actions, alerts, profiles, etc.

In some examples, behavioral activity predictor 124 of ALAM server 102 may use one or more machine learning algorithms to determine/predict spending habits and/or to provide suggestive alerts to users. Non-limiting suggestive alerts may include relevant promotions, interest rate changes, auto-reminders (e.g., close to monthly spending limit), etc. As discussed above, the alerts may be communicated to user device(s) 106 by email, text message, via interactive GUI 128 or any suitable form of communication.

ALAM server 102 may further be configured to provide continual updates to a rolling balance and may update a strategy for presentation to the user on graphic dashboard 130 accordingly. In some examples, ALAM server 102 may identify when to target consumers (for example, through monitoring of POS purchases among POS system(s) 104-2). In some examples, ALAM server 102 may discover an optimal method of communication with user device(s) 106 (e.g., text messages, email, in-app notifications).

In some examples, ALAM server 102 may be configured to leverage data and/or analytics across the entire life cycle of the user from initiation of a system account with ALAM server 102 through servicing one or more of the user's accounts (e.g., electronic account(s) 110, virtual account(s) 138, virtual card(s) 140, virtual wallet(s) 112) by ALAM server 102. Life cycle processing by ALAM server 102 may include account creation, application for one or more lines of credit, connections to multiple parties, leveraging of new and existing products and/or data, showcasing contextual information, and providing customization and personalization for a specific user based on past/current/predicted behavioral activity and experiences coupled with personalized communications.

In some examples, during a login process, ALAM server 102 may grant access to various features and functions of ALAM server 102 based on a variety of internal data and external data that may provide a very simple user login experience, while managing elements such as authentication, fraud alert checks and know your customer (KYC) on behalf of the user. With minimal information (e.g., full name, last name and some personally identifiable information (PII)) ALAM server 102 may identify and prefill user information.

In some examples, interactive GUI 128 may be generated to provide a customizable/personalized user experience. For example, interactive GUI 128 may be configured to receive as input historic, current (real-time) and/or forward looking data and information. In some examples, interactive GUI 128 may present offers, suggestions, alerts, actions and the like based on past experiences and usage, and may suggest new products that could help, for example, save the user money, build rewards and suggest additional contextual notices for the user.

In some examples, ALAM server 102 may be configured to leverage data from other users in the system and create personas, benchmark best practices (e.g., based on historical information), etc., and may also predict where it may be desirable for the user to save or instances where the user may be able to spend their funds. ALAM server 102 may provide suggestions such that the user is in control of the funds in their account(s), while being guided by the suggestions to make an optimal decision. For example, ALAM server 102 may learn and identify high levels and more volatile periods of higher expenses for the user. The identification of higher/volatile expense periods together with access to the accounts of the user, by ALAM server 102, allows ALAM server 102 to provide an improved technique to managing expenses of the user while keeping the electronic funds in the user's accounts at a stable level (e.g., a stable cash flow level).

In some examples, ALAM server 102 may be configured to take a 360-degree view of the needs of the user (e.g., periodic expenses, unexpected expenses, etc.), as well as the usage of the accounts of the user. ALAM server 102 may use these needs and usage to guide the user to new products and/or features that may leverage data from linked accounts, external sources and (in some examples) community data so that information may be shared instantaneously and executed upon (e.g., either automatically or by the user).

The 360-degree view may be used to predict habits of the user, problems that may exist or that may occur. For example, ALAM server 102 may determine whether certain conditions exist or whether certain triggers exist (e.g., different categories of activities, stability between income and expense levels, payments history). Based on any identified and/or potential problems, ALAM server 102 may pre-warn (e.g., alert) and/or provide new alternatives for the user.

While all this information and intelligence may be gathered and analyzed, ALAM server 102 may be configured to provide this information to the user at an appropriate time, an appropriate place and in an appropriate context. In some examples, ALAM server 102 may leverage the intelligence to provide alternative products for a suitable pricing, depending on a service level accessible by the user, a relationship strength of the user and/or a risk profile of the user (which information may be monitored regularly to detect any changes).

In some examples, ALAM server 102 may utilize the intelligence created based on multiple combinations of the input data, and may share the intelligence with the user in an appropriate context based on the user's needs and goals.

Figure 2:
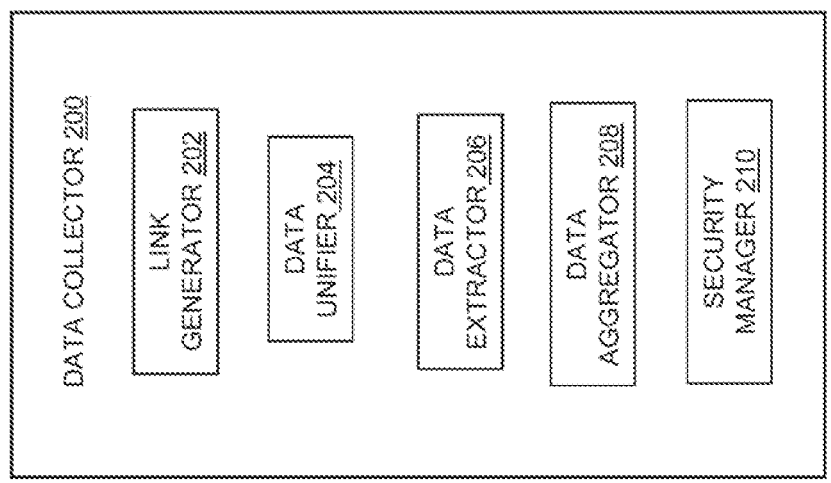
FIG. 2 is a functional block diagram of an example data collector system, according to an aspect of the present disclosure.

FIG. 2 is a functional block diagram of example data collector 200, according to an aspect of the present disclosure. Data collector 200 may include link generator 202, data unifier 204, data extractor 206, data aggregator 208 and security manager 210, which may communicate with each other via a data and control bus (not shown). Although not shown, in some examples, data collector 200 may include a controller (e.g., a processor, a microcontroller, a circuit, software and/or other hardware component(s)) specially configured to control operation of link generator 202, data unifier 204, data extractor 206, data aggregator 208 and security manager 210.

Link generator 202 may be configured to establish one or more communication links with one or more of information system(s) 104, electronic account(s) 110, user device(s) 106 and/or virtual wallet(s) 112 (also collectively referred to herein as information sources) via a network (e.g., see network(s) 108 of FIG. 1) (and/or via a direct connection) and obtain electronic data (e.g., via I/O interface(s) 114) that may be useful for managing and integrating electronic account(s) 110 of a user. In some examples, the communication link may include security protection (e.g., encryption). In some examples, link generator 202 may authenticate one or more of the information sources and/or validate electronic data received from among one or more of the information sources.

In some examples, link generator 202 may generate a communication link with one or more information sources based on linking information associated with a specific user profile(s) 136 and/or linking information associated with data profile(s) 142. In some examples, link generator 202 may obtain electronic data from among the information sources via I/O interface(s) 114 (FIG. 1).

In general, link generator 202 may obtain electronic data (over at least one established communication link) through one or more live data feeds (e.g., a real-time data connection), one or more file transfers, from pushed data (e.g., data pushed from information sources to link generator 202), from data pulled by link generator 202 (from information sources), and any other suitable technique for obtaining electronic data. Link generator 202 may obtain the electronic data from the information sources in real-time, periodically, according to one or more events and the like.

In some examples, link generator 202 may allow for the creation of a completely automated data communication interface to and from information sources with a suitable type of automated data reformatting, and data value translation associated with corresponding information sources. In this manner, link generator 202 may not only obtain data from among the information sources, link generator 202 may transmit data and information to information sources in accordance with the specific data parameters (e.g., format, data translation, etc.) of each specific information source.

Data unifier 204 may be configured to receive electronic data obtained by link generator 202 (or in some examples may receive unified data from data unifier 204), and may perform one or more of filtering, data normalization, data reformatting and the like. In some examples, electronic data may include data that may be unable to be processed, data that includes one or more errors and the like. In some examples, different information sources may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by data unifier 204 may include excluding null data values, excluding corrupted data, excluding outlier data values (e.g., a data value outside of a predefined value range, outside of a predefined time range) and the like. In some examples, data unifier 204 may reformat the received data to a common format and/or normalize the data obtained from the communication links, thereby forming unified data.

Data extractor 206 may be configured to parse and extract data and/or information from the unified data (received from data unifier 204, or in some examples, directly from link generator 202). The extracted data/information may include any suitable data/information associated with a specific user (e.g., a transaction, a credit card, a POS system of the transaction) and associated information (e.g., transaction size, time of transaction, etc.) that may be useful for determining user behavioral activity and managing the user's data accounts (e.g., electronic account(s) 110, virtual account(s) 138 of FIG. 1). In some examples, data extractor 206 may extract the data/information from a portion of one or more data feeds that may not be directly associated with a user and/or that may be independent of the user (e.g., live market data). In some examples, data extractor 206 may parse data and extract suitable data/information useful for user behavioral activity analysis. Thus, data extractor 206 may also act as a filter, to reduce the number of data values/information needed for user behavioral activity analysis (e.g., performed by ALAM server 102 of FIG. 1).

Data aggregator 208 may be configured to aggregate the extracted data extracted from among the information sources according to one or more predefined categories (e.g., according to specific user, a user's specific credit card, a type of data, one or more predetermined time periods, etc.). In some examples, data aggregator 208, may be configured to map (e.g., index) the aggregated data to the predefined category(s). In some examples, extracted data (received from data extractor 206) may be aggregated (i.e., combined and mapped) into storage 118 (FIG. 1) based on predetermined categories.

Security manager 210 may include one or more encryption and decryption keys and may be configured to provide data security protection of data received (and/or transmitted) from link generator 202. The encryption/decryption keys may include independent keys associated with respective information sources. Security manager 210 may be configured to provide automated encryption of all sensitive data stored in ALAM server 102 (FIG. 1), for example, the data stored in storage 118. In some examples, security manager 210 may operate synchronous with link generator 202 to decrypt received data from the information sources, permit data unifier 204, data extractor 206 and data aggregator 208 to perform their respective operations and then encrypt the now aggregated data from data aggregator 208. In some examples, security manager 210 may provide secure, unified and aggregated data to storage 118 (FIG. 1).

Figure 3:
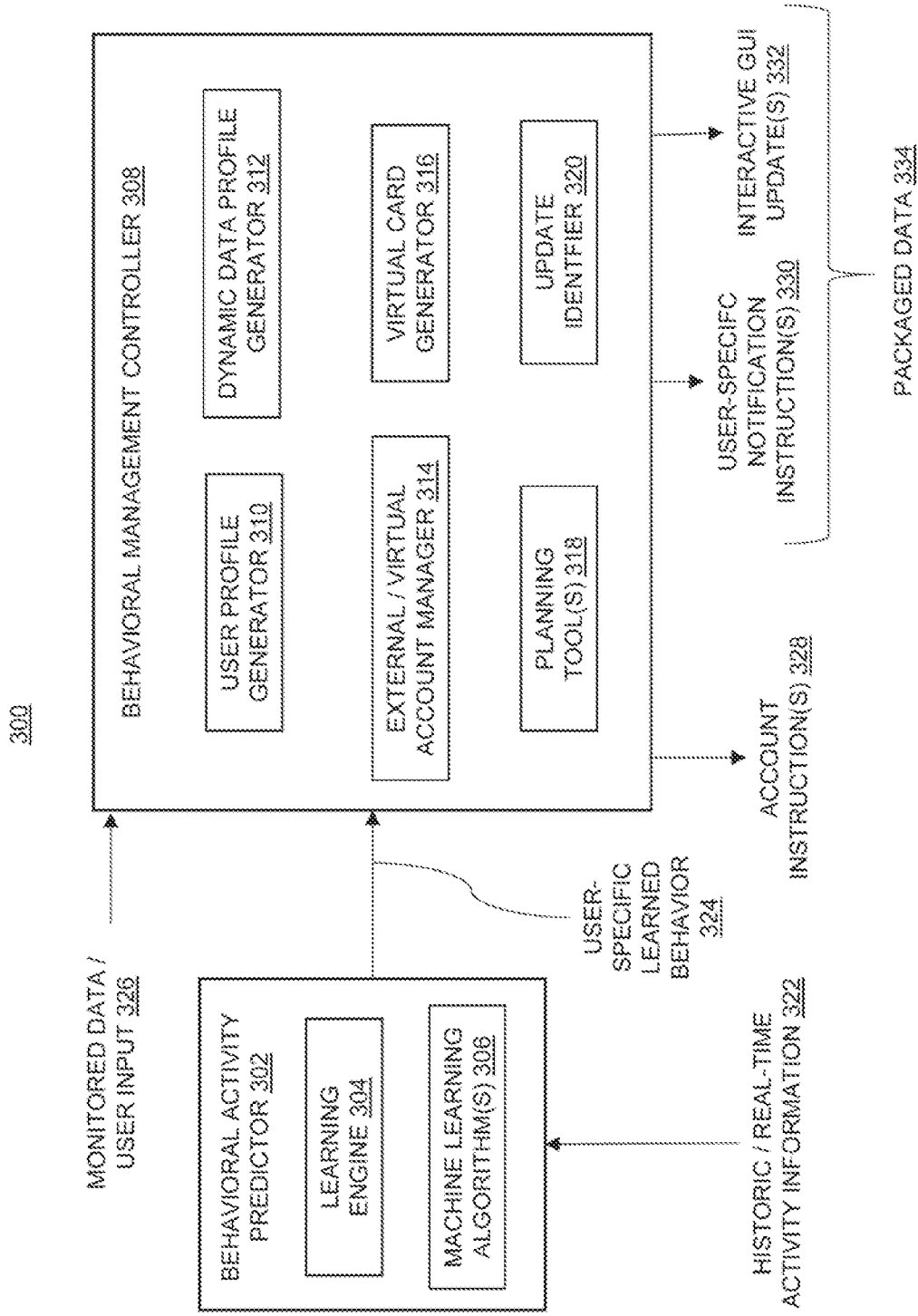
FIG. 3 is a functional block diagram of an example artificial intelligence (AI) engine, according to an aspect of the present disclosure.

FIG. 3 is a functional block diagram of example artificial intelligence (AI) engine 300, according to an aspect of the present disclosure. AI engine 300 may include behavioral activity predictor 302 and behavioral management controller 308.

Behavioral activity predictor 302 may include learning engine 304 and one or more machine learning algorithms 306. Behavioral management controller 308 may include user profile generator 310, dynamic data profile generator 312, virtual card generator 316, external/virtual account manager 314 (also referred to herein as account manager 314), one or more planning tools 318 and update identifier 320, which may communicate with each other via a data and control bus (not shown). Although not shown, in some examples, one or more of behavioral activity predictor 302 and behavioral management controller 308 may include a controller (e.g., a processor, a microcontroller, a circuit, software and/or other hardware component(s)) specially configured to control operation of one or more of components 304, 306, 310, 312, 314, 316, 318 and 320.

Learning engine 304 of behavioral activity predictor 302 may obtain activity information 322 associated with a specific user and/or other data that may be independent of the specific user. Activity information 322 may include, without being limited to, historic user activity, real-time user activity, current and/or past events (e.g., a user's real-estate purchase, a salary increase of the user, a change in interest rates, a change in the stock market, etc.) that may influence the behavioral activity of the specific user. Learning engine 304 may receive activity information 322 from among, for, example, behavioral management controller 308, data monitor 120 (FIG. 1), user profile(s) 136, virtual account(s) 138, virtual card(s) 140, data profile(s) 142 and the like.

Learning engine 304 may determine, based on activity information 322, user-specific learned behavior 324 (of the specific user) by implementing machine learning algorithm(s) 306. In general, learning engine 304 may use machine learning algorithm(s) 306 to learn any patterns and/or behavioral activity specific to a user based on one or more of backward looking information (e.g., historical activity of the user), current information and future predictions. In this manner, learning engine 304 may track historic user activity and predict future user behavioral activity.

Machine learning algorithm(s) 306 may include any well-known type of algorithm configured to classify the obtained activity information 322, to learn any patterns/behavioral activity specific to a user and make predictions on future behavioral activity. Machine learning algorithm(s) 306 may include any well-known type of approach, such as, without being limited to, supervised learning, unsupervised learning, semi-supervised learning and the like. In some examples, machine learning algorithm(s) 306 may be configured to build one or more mathematical models, which model(s) may be used to learn and predict the user's behavioral activity. Non-limiting examples of well-known models that may be used in machine learning algorithm(s) may include artificial neural networks, decision trees, support vector machines, regression analysis and Bayesian networks. Learning engine 304 may provide user-specific learned behavior 324 to behavioral management controller 308.

In general, behavioral management controller 308 may receive user-specific learned behavior 324 (from behavioral activity predictor 302), monitored data/user input 326 (e.g., from data monitor 120 and/or user input via interactive GUI 128 shown in FIG. 1), as well as any other data (e.g., data from among storage 118 shown in FIG. 1). Responsive to the received data, behavioral management controller 308 may generate one or more outputs, including one or more account instructions 328, one or more user-specific notification instructions 330 and one or more interactive GUI updates 332. In some examples, user-specific notification instruction(s) 330 and interactive GUI update(s) 332 may represent examples of packaged data 334 that may provide personalized insights about the user's linked accounts (such as personalized notices, alerts and the like) that may align with the behavior activities and spending habits of the specific user. Although not shown, behavioral management controller 308 may also store data and information generated by one or more of components 310-320 in storage (e.g., storage 118 shown in FIG. 1).

User profile generator 310 may receive user input (e.g., from among monitored data/user input 326), and may generate a user profile associated with the user. Non-limiting examples of information that may be included in a user profile may include user information (e.g., identity information, account information, security information and the like), an annualized income, a monthly income, spending information, buffer information between spending and income (e.g., a buffer over various time periods such as six months, twelve months, etc.) and any other suitable information. User profile generator 310 may store the generated user profile (e.g., user profile(s) 136 shown in FIG. 1) in storage (e.g., storage 118 shown in FIG. 1). In some examples, user profile generator 310 may dynamically update the generated user profile based on changes in information and data (e.g., from among monitored data/user input 326, user-specific learned behavior 324) and the like. In some examples, the generated user profile may be updated in real-time and/or near-real-time.

Dynamic data profile generator 312 may receive, for example, monitored data (e.g., from among monitored data/user input 326), and may generate one or more dynamic data profiles of other data and information that may be useful for managing the internal and/or external account(s) of a specific user (e.g., electronic account(s) 110 and/or virtual account(s) 138 shown in FIG. 1). Non-limiting examples of data profile information may include live market data activity, one or more credit scores, relevant offers (e.g., that may improve management of one or more of the external and/or internal accounts), automated notices, product offerings, etc. Dynamic data profile generator 312 may store the generated data profile(s) (e.g., data profile(s) 142 shown in FIG. 1) in storage (e.g., storage 118 shown in FIG. 1). In some examples, dynamic data profile generator 312 may dynamically update the generated data profile(s) based on changes in information and data (e.g., from among monitored data/ user input 326) and the like. In some examples, the generated dynamic data profile(s) may be updated in real-time and/or near-real-time, based on monitoring of data and information by data monitor 120 (FIG. 1), including live (i.e., real-time) data.

Account manager 314 may receive, for example, monitored data and/or user input (e.g., from among monitored data/user input 326), user-specific learned behavior 324, account information (e.g., information of electronic account(s) 110, information of virtual account(s) 138, information of virtual wallet(s) 112) as well as any other suitable data (e.g., user profile(s) 136, data profile(s) 142) and may manage one or more external data accounts of a specific user (e.g., electronic account(s) 110 and/or virtual wallet(s) 112 shown in FIG. 1) and/or one or more internal virtual data accounts (e.g., virtual account(s) 138 shown in FIG. 1). In some examples, account manager 314 may create one or more internal accounts (e.g., virtual account(s) 138). In general, account manager 314 may manage (e.g., create and/or modify) internal and/or external electronic data account(s) associated with a specific user according to one or more predefined routines. Modification to data account(s) associated with a user may include, without being limited to, transferring data among the user's internal and/or external data account(s), adding data to one or more of the user's data accounts, removing data from among one or more of the user's data accounts and/or closing one or more of the user's internal and/or external account(s).

In some examples, account manager 314 may dynamically update the user's external and/or internal account(s) based on changes in information and data (e.g., from among monitored data/user input 326, user-specific learned behavior 324, account information) and the like. In some examples, account manager 314 may update the user's account(s) in real-time and/or near real-time.

Account manager 314 may manage the external and/or internal account(s) of a specific user based on one or more predetermined routines according to one or more predefined conditions and/or parameters set by behavioral management controller 308 (or ALAM server 102 shown in FIG. 1), one or more predefined conditions and/or parameters set by the specific user and/or any combination thereof. In some examples, creation of one or more internal data account(s) may include triggering (e.g., activating) virtual card generator 316 to create one or more virtual cards associated with the user. In some examples, the management of the user's data accounts (including creation of any internal virtual accounts and/or virtual cards) may be based on planning tool(s) 318. In some examples, the management of the user's data accounts (including creation of any internal virtual accounts and/or virtual cards) may be based on any subscriptions of the user to one or more predefined products and/or features (e.g., predefined products and/or features provided by ALAM server 102 as subscribed to via optional subscription server 144 of FIG. 1).

In some examples described herein, the data of the data accounts are illustrated as being transactional data. In some examples, the transactional data may include, without being limited to, purchases, returns, invoices, debits, trades, dividends, interest, payroll, lending, subscriptions, contractual fees and/or donations. It is understood that account manager 314 (and ALAM server 102 of FIG. 1 in general) may manage data accounts having any suitable type of data, including, but not limited to sensor data, user input, interaction data (e.g., user interactions with a website, transactional data and the like), metadata, calculated data, historical data, predictive data and the like.

In some examples, account manager 314 may generate one or more account instructions 328 for creating and/or modifying one or more external accounts (e.g., electronic account(s) 110 and/or virtual wallet(s) 112 shown in FIG. 1) and/or one or more internal virtual accounts (e.g., virtual account(s) 138 shown in FIG. 1). In some examples, ALAM server 102 may communicate account instruction(s) 328 with one or more of electronic account(s) 110 and/or virtual wallet(s) 112 via data collector 116 and I/O interface(s) 114 and/or may communicate account instruction(s) 328 to virtual account(s) 138).

Virtual card generator 316 may generate one or more virtual cards (e.g., virtual card(s) 140 shown in FIG. 1) associated with a specific user according to one or more predefined routines. In some examples, virtual card generator 316 may generate user-specific virtual card(s) in response to one or more of monitored data and/or user input (e.g., from among monitored data/user input 326), user-specific learned behavior 324, account information (e.g., information from account manager 314, information of electronic account(s) 110, information of virtual account(s) 138, information of virtual wallet(s) 112) as well as any other suitable data (e.g., user profile(s) 136, data profile(s) 142. In some examples, virtual card generator 316 may initiate creation of user-specific virtual card(s) upon activation by account manager 314 to generate a virtual account associated with the virtual card. In examples where virtual card generator 316 may generate virtual card(s) independent of account manager 314, virtual card generator 316 may transmit virtual card information for any created virtual card(s) to account manager 314, so that account manager 314 may create and manage a corresponding (internal) virtual account associated with the virtual card(s).

In general, virtual card generator 316 may create user-specific virtual card(s) based on one or more predetermined routines according to one or more predefined conditions and/or parameters set by behavioral management controller 308 (or ALAM server 102 shown in FIG. 1), one or more predefined conditions and/or parameters set by the specific user and/or any combination thereof. In some examples, the user-specific virtual card(s) created by virtual card generator 316 may include any information associating the virtual card(s) with the specific user, card number information for performing transactions with the virtual card(s), routing information for the virtual card(s) and the like. Virtual card generator 316 may be configured to store the user-specific virtual cards(s) (e.g., storage 118 of FIG. 1).

In some examples, creation of virtual card(s) by virtual card generator 316 may be based on planning tool(s) 318. In some examples, creation of virtual card(s) by virtual card generator 316 may be based on any subscriptions of the user to any predefined product(s) and/or feature(s) (e.g., predefined product(s) and/or feature(s) provided by ALAM server 102 as subscribed to via optional subscription server 144 of FIG. 1).

In some examples, behavioral management controller 308 may include planning tool(s) 318. In some examples, planning tool(s) 318 may include one or more routines for providing suitable financial and planning advice tools and/or benefits to users. In some examples, access to one or more features of planning tool(s) 318 may depend upon a subscription of the user (including in some examples, a service level), such as may be maintained by optional subscription server 144 (FIG. 1). In one non-limiting example, planning tool(s) 318 may include routines to aggregate insights into a user's spending habits from across various expenses (e.g., mortgage payments, credit card payments, student loans, utility payments, large purchases, etc.) over time. Then, based on the user's specific spending habits, behavioral management controller 308 may suggest an interest free loan to pay off some of the user's revolving debt (e.g., credit card debt). In some examples, the behavioral management controller 308 may package data from among linked accounts of the user and may couple it (including, in some examples, based on a with a subscription and/or a service level) to provide one or more products that may be of interest or benefit to the user. In some examples, one or more routines and/or outputs of planning tool(s) 318 may be used as input(s) to update identifier 320, and may be used by update identifier 320 to determine user-specific notification instruction(s) 330 and/or interactive GUI update(s) 332.

Update identifier 320 may receive data and/or information, for example, from among monitored data/user input 326, user-specific learned behavior 324, user profile information (e.g., from user profile generator 310), data profile information (e.g., from dynamic data profile generator 312), account information (e.g., from account manager 314), planning tool information (e.g., from planning tool(s) 318) and/or any other suitable information source (that may include information associated with a user and/or information that may be independent of the user). Based on the received data/information, update identifier 320 may generate packaged data 334, such as one or more user-specific notification instructions 330 and/or (user-specific) interactive GUI update(s) 332 according to on one or more routines.

In some examples, user-specific notification instruction(s) 330 may be transmitted to notification generator 126 (FIG. 1). In some examples, user-specific notification instruction(s) 330 may include alert(s) and/or action(s) for presentation (and in some examples, prompts for user input) to the user (e.g., on user device(s) 106) and/or on graphic dashboard 130 of interactive GUI 128.

In some examples, interactive GUI update(s) 332 may be transmitted to an interactive GUI (such as interactive GUI 128 shown in FIG. 1). In some examples, interactive GUI update(s) 332 may include instructions for dynamically updating graphic dashboard 130 of interactive GUI 128 of FIG. 1, including automatically updating graphic dashboard 130 in response to changes in data and information, including in real-time and/or near-real time.

In some examples, update identifier 320 may include one or more routines for categorizing of activities (e.g., income/expenditures), identifying stable activities (e.g., monthly utility payments, mortgage payments, smaller-more predictable expenditures such as food, clothing), identify volatile/variable activities (e.g., ancillary expenditures, not as predictable expenditures such as travel, airline tickets, large purchases, car repairs, medical bills), prepare a graphic (e.g., visual) dashboard representing user activity, poll interest rates, automatically cause user profile generator 310 to update the user profile based on current interest rates, provide a credit score and/or display user-defined information by account, and/or other activity. It may be appreciated that, in some examples, the various alerts and/or actions triggered by behavioral activity predictor 302 in combination with behavioral management controller 308 may help the user better understand their spending habits, and to suggest products/services to improve the user's profile.

In a non-limiting example, input data to AI engine 300 may include at least one of KYC data, historical data, external data (including across multiple sources), benchmarking data, relationship strength information, product and/or other product usage data, behavioral data, past user experiences, past spend patterns of the user, user habits, income levels, aspirations, channel usage, channel receptivity, user profile changes, data profile changes and user preferences.

In a non-limiting example, packaged data 334 may include at least one of personalized recommendations, personalized advice, personalized optimization(s), predictions, personalized alerts, seamless integration across products, dynamic messaging, dynamic display of data/information, real-time contextual updates/communication, access to unique features based on needs of the user/user aspirations/data, user interface experiences tailored and based on user information, specific service level(s), rewards, pricing information, and user support so that information may be accessed at anytime, anywhere and from any device.

Components of ALAM server 102 (FIG. 1) of the present disclosure may be embodied on a single computing device. In other examples, components of ALAM server 102 may be embodied on two or more computing devices distributed over several physical locations, connected by one or more wired and/or wireless links. It should be understood that ALAM server 102 of the present disclosure refers to a computing system having sufficient processing and memory capabilities to perform the specialized functions described herein.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

Figure 4:
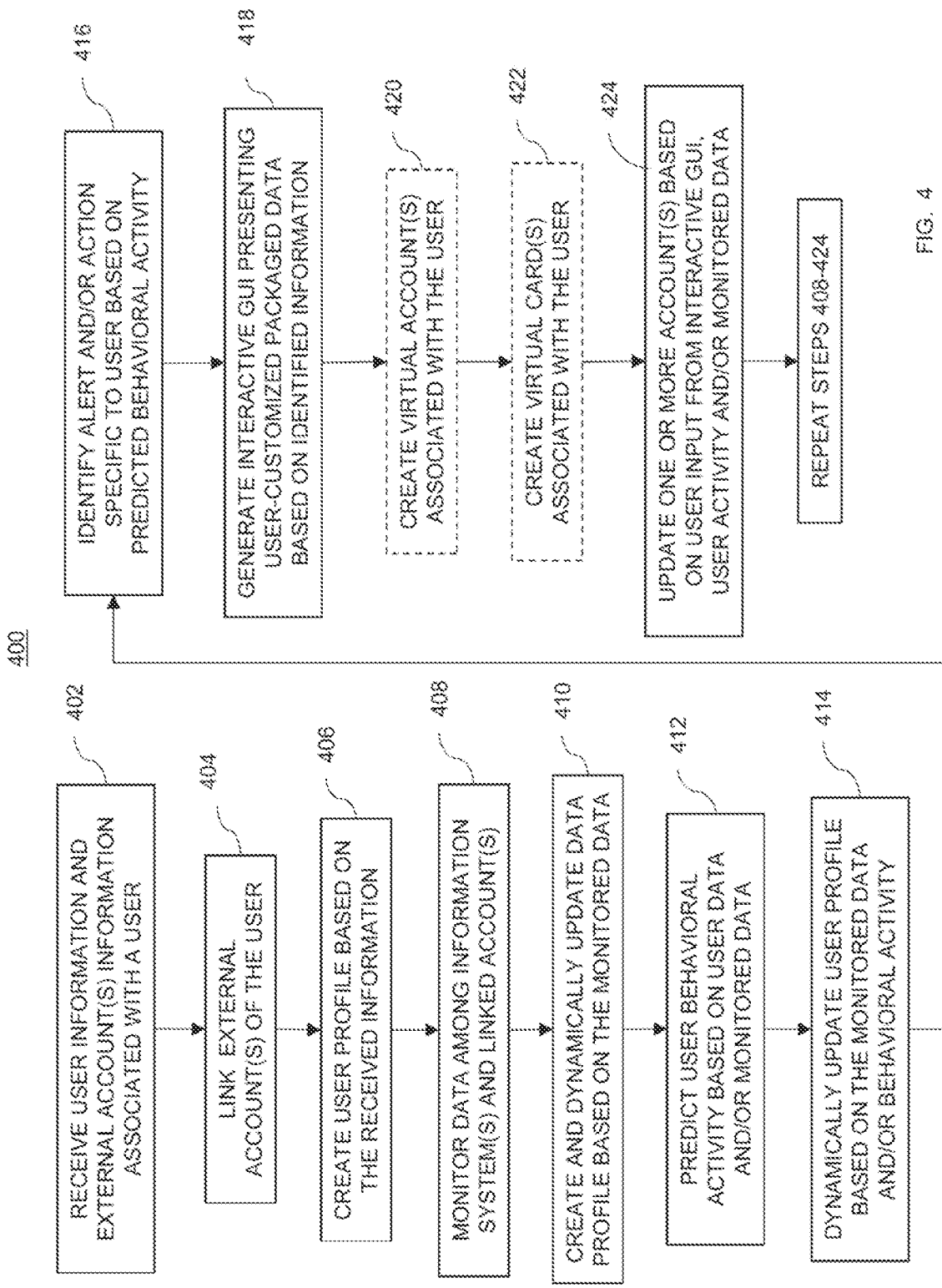
FIG. 4 is a flow chart diagram of an example method of customized data account management based on behavioral activity prediction of a user, according to an aspect of the present disclosure.
Figure 5:
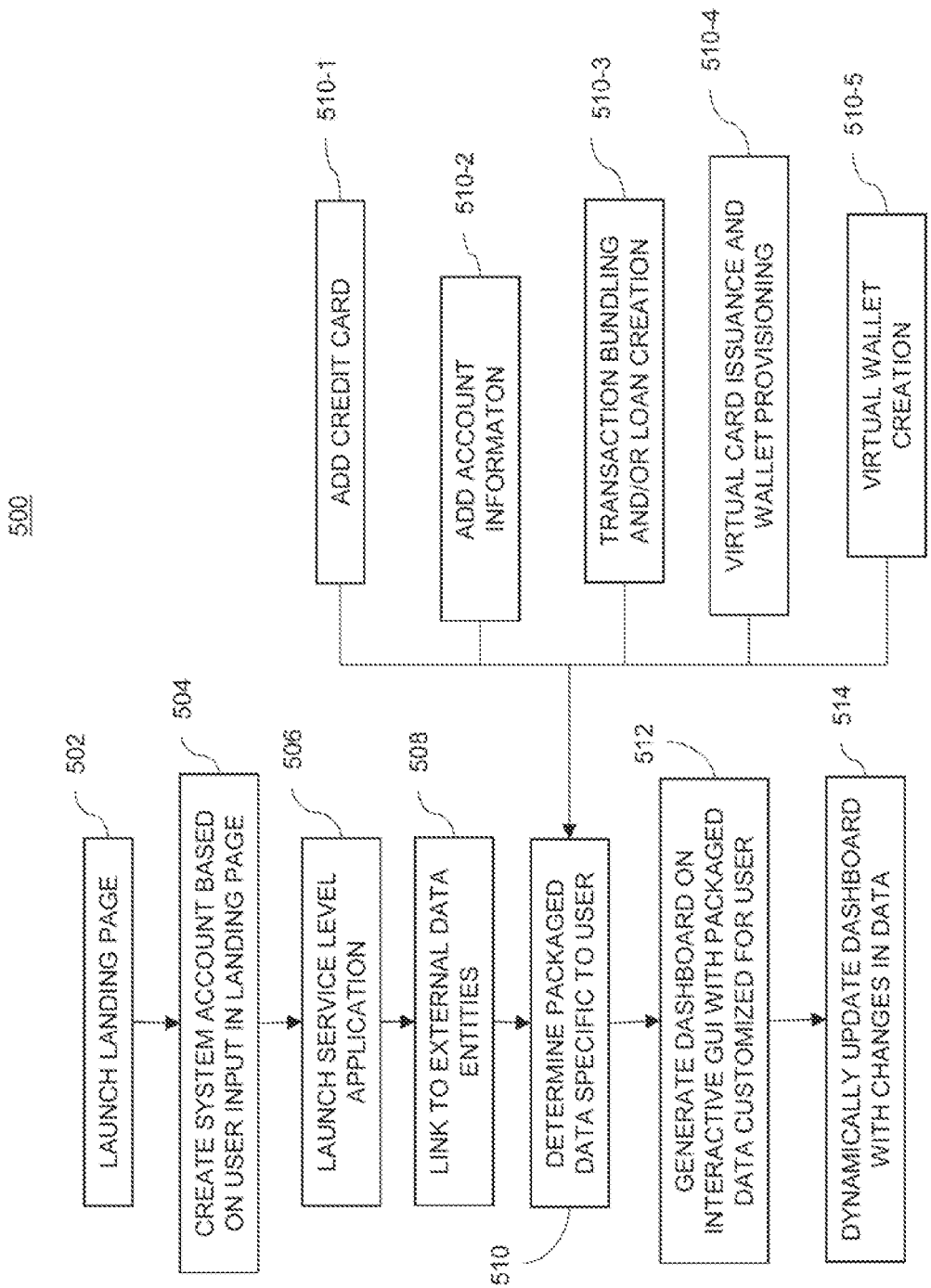
FIG. 5 is a flow chart diagram of an example method of operating an interactive graphical user interface (GUI) to provide user-customized packaged data associated with linked accounts of a user, according to an aspect of the present disclosure.

Those skilled in the art will appreciate that ALAM server 102 (of FIG. 1) may be configured with more or less components to conduct the methods described herein with reference to FIGS. 4 and 5. The methods described herein (that may be conducted by ALAM server 102 of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components associated with components 202-210 of data collector 200 of FIG. 2, and components 302-320 of AI engine 300 of FIG. 3.

FIG. 4 is a flowchart diagram of an example method 400 of customized data account management based on behavioral activity prediction of a user associated with data account management system 100 of FIG. 1, according to an aspect of the present disclosure.

At step 402, data collector 116 of ALAM server 102 may receive user information and information regarding one or more external accounts (e.g., electronic account(s) 110, virtual wallet(s) 112, etc.) associated with a user. For example, data collector 116 may communicate with user device(s) 106 of the user via I/O interface(s) 114. In some examples, ALAM server 102 may prompt the user for user and account information by generating one or more user input screens on a display of user device(s) 106 (such as by generating one or more initiation screens of graphic dashboard 130 of interactive GUI 128 on the display of user device(s) 106). In some examples, ALAM server 102 may store the received information in storage 118.

At step 404, ALAM server 102 may generate one or more links to the external account(s) of the user. For example, link generator 202 (FIG. 2) of data collector 200 (FIG. 2) may generate link(s) to electronic account(s) and/or virtual wallet(s) 112, based on the received user and account information (step 402).

At step 406, behavioral management controller 122 of ALAM server 102 (or user profile generator 310 of behavioral management controller 308) may create at least one user profile 136 associated with the user, based on the received user and account information (step 402). ALAM server 102 may store the created user profile(s) 136 in storage 118.

At step 408, data collector 116 of ALAM server 102 may obtain data and information (via I/O interface(s) 114) and data monitor 120 may monitor the obtained data/information to form monitored data. The obtained data/information may be obtained from among one or more of information system(s) 104, electronic account(s) 110, user device(s) 106, virtual wallet(s) 112 and any other suitable sources of data and information that may be useful for user-specific management of data accounts of the user. In some examples, data collector 116 may perform additional processing of the obtained data/information, including, for example, unification (e.g., via data unifier 204 of FIG. 2), extraction (e.g., via data extractor 206 of FIG. 2), and/or aggregation (e.g., via data aggregator 208 of FIG. 2. In some examples, the data/information that is obtained may be encrypted. Data collector 116 may receive the encrypted data/information and may decrypt the obtained data/information (e.g., via security manager 210 of FIG. 2). In some examples, data monitor 120 may continuously monitor the obtained data/ information. Data monitor 120, in some examples, may identify data/information that meets one or more predetermined conditions and/or parameters, and may include data/ information that meets the condition(s)/parameter(s) as monitored data.

At step 410, behavioral management controller 122 of ALAM server 102 (or dynamic data profile generator 312 of behavioral management controller 308) may create one or more dynamic data profiles 142 from among the monitored data (step 408). In some examples, data profile(s) 142 may include data and/or information that may change over time, and may be indirectly associated with the user and/or data that may be independent of the user, but may also be useful for managing the user's electronic account(s) 110. Behavioral management controller 122 may dynamically update data profile(s) 142 as the data and/or information changes, including, in some examples, in real-time and/or near-real-time. Behavioral management controller 122 may store (and dynamically update) data profile(s) 142 in storage 118.

At step 412, behavioral activity predictor 124 may learn a behavioral activity of the user, and may predict behavioral activity of the user in accordance with the learned behavior. In some examples, behavioral activity predictor 124 may predict the behavioral activity of the user based on one or more of user data stored in user profile(s) 136 (e.g., historical user activity, current user activity), monitored data (e.g., as monitored by data monitor 120, data profile(s) 142, etc.) and any other suitable data and/or information.

At step 414, behavioral management controller 122 may dynamically update user profile(s) 136 (e.g., stored in storage 118) based on the monitored data (step 408) and/or behavioral activity (step 412). For example, user profile generator 310 (FIG. 3) may update user profile(s) 136 based on changes in monitored data (including any user input into interactive GUI 128) and/or any updates received from behavioral activity predictor 302 (e.g., a change in the user's predicted behavioral activity, an update to the user's current activity and the like).

At step 416, behavioral management controller 122 (e.g., update identifier 320 of behavioral management controller 308 of FIG. 3) may identify one or more alerts and/or one or more actions specific to the user (collectively referred to as user-specific notification instruction(s)) based on at least the predicted behavioral activity of the user (step 412). In some examples, the notification instruction(s) may be sent to notification generator 126, and notification generator 126 may transmit the alert(s)/action(s) to user device(s) 106 in an electronic communication (e.g., in an email, as a text message, etc.). In some examples, the notification instruction(s) may be transmitted to user device(s) 106 as an electronic communication and also presented on graphic dashboard 130 of interactive GUI 128. In some examples, the notification instruction(s) may be presented on graphic dashboard 130 (e.g., without being transmitted to user device(s) 106 as a separate electronic communication).

At step 418, interactive GUI 128 may generate graphic dashboard 130 that may present user-customized packaged data, including data based on the identified information (e.g., alert and/or action) in step 416. The packaged data may include information specific to the user that may be useful for managing the user's data accounts (including, in some examples, multiple independent external electronic accounts 110). For example, graphic dashboard 130 may be generated to present one or more of user profile(s) 136, linked account information (e.g., of electronic account(s) 110, virtual wallet(s) 112, virtual account(s) 138 and the like), data profile(s) 142, and identified alert(s) and/or action(s) (step 416). Graphic dashboard 130 may also display one or more regions for user input, including the ability to provide user input to any alert(s) and/or action(s). In general, graphic dashboard 130 of interactive GUI 128 may be updated in response to any changes in information displayed on graphic dashboard and/or any user input (e.g., including being updated to changes in real-time and/or near real-time). In some examples, interactive GUI 128 may be presented to user device(s) 106 via AM web portal 132 and/or AM application(s) 134.

At optional step 420, behavioral management controller 122 (e.g., external/virtual account manager 314 of behavioral management controller 308 shown in FIG. 3) may create one or more virtual accounts 138 associated with the user. In some examples, virtual account(s) 138 may be generated responsive to user input to identified alert(s)/ action(s). For example, based on the monitored data (step 408), user profile(s) 136 (including any updates), predicted behavioral activity (step 412) (including any updates) and/or data profile(s) 142, behavioral management controller 122 may automatically create virtual account(s) 138 (e.g., based on one or more predetermined conditions and/or parameters set by ALAM server 102 and/or via user input) or may create virtual account(s) 138 responsive to user confirmation via user input (via interactive GUI 128).

At optional step 422, behavioral management controller 122 (e.g., virtual card generator 316 of behavioral management controller 308 shown in FIG. 3) may create one or more virtual card(s) 140 associated with the user (and which may be associated with one or more of virtual account(s) 138). In some examples, creation of virtual card(s) 140 may be triggered by the creation of virtual account(s) 138 (optional step 420). In some examples, creation of virtual card(s) 140 (in optional step 422) may then trigger the creation of one or more corresponding virtual account(s) 138. In some examples, virtual card(s) 140 may be created automatically (e.g., based on one or more predetermined conditions and/or parameters set by ALAM server 102 and/or via user input) or responsive to user confirmation via user input (via interactive GUI 128).

At step 424, behavioral management controller 424 (e.g., account manager 314 of behavioral management controller 308 of FIG. 3) may update (i.e., modify) one or more account(s) of the user (and, in some examples, may create one or more electronic data account(s)). The account(s) may be updated (and/or created) based on user input received from interactive GUI 128, user profile(s) 136 (including user activity information), predicted user activity behavior (step 412), data profile(s) 142 and/or monitored data (step 408). The accounts that may be updated (and/or created) may include, without being limited to, electronic account(s) 110, virtual account(s) 138, virtual wallet(s) 112 and the like.

In some examples, steps 408-424 may be repeated, in accordance with changes in information and data, including, in some examples, in real-time and/or near real-time. For example, step 408 may include continually monitoring data. Thus, steps 410-424 may be repeatedly updated with changes in the continuously monitored data (as well as any user inputs in interactive GUI 128).

FIG. 5 is a flow chart diagram of an example method 500 of operating an interactive GUI (e.g., interactive GUI 128 in FIG. 1) to provide user-customized packaged data associated with linked accounts of a user, according to an aspect of the present disclosure. At step 502, a landing page of interactive GUI 128 may be launched (e.g., by ALAM server 102). In some examples, the landing page may include one or more regions for user input, to receive user information for creating (or logging in to) a system account (e.g., an account associated with ALAM server 102) that may provide the user with access to one or more products associated with one or more service levels. In some examples, the landing page may support multi-channel and/or modal support (e.g., in a website, a mobile application, embedded within another application or product and the like).

At step 504, a system account may be created (for example, by ALAM server 102) responsive to user input in the launch page (at step 502). For example, the user input may include one or more of user information (e.g., user name, location, user device information, etc.), security information (e.g., password, security response, etc.), external account information (e.g., types of account(s), total account balance, location(s) of account(s), etc.), desired account management goals, user-defined parameters, and the like. In some examples, step 502 may be skipped if a system account already exists (e.g., if the user input in step 502 is to log into an existing system account). In some examples, ALAM server 102 may support one or more of password-less login, multi-channel support, multi-persona support and intelligent authentication using multiple technologies (e.g., biometrics, behind the scene checks and the like).

At step 506, a service level application may be launched on interactive GUI 128. In some examples, the service level application may be selected from among different applications associated with different service levels (e.g., where different service levels may provide access to different products and/or different combinations of products). In some examples, the service level application may be automatically selected based on the user input used to create the system account (step 504). In some examples, the landing page may provide additional prompts for user input, and interactive GUI 128 may select a suitable service level application based on at least user input to the additional prompts. In some examples, the service level application may support one or more of a preapproval process and a final approval process. In some examples, the service level application may include a predefined model to approve one or more applications. In some examples, the service level application may refer to a series of inquiries used to determine an extent of access (e.g., a service level the user will have). In some examples, the service level application may refer to the ability of service level application to launch or may provide choices that the user might not have realized were available (e.g., saving opportunities, access to some specific rewards, etc.).

At step 508, ALAM server 102 may link to external data entities (e.g., one or more of information system(s) 104, account(s) 110, user device(s) 106, virtual wallet(s) 112 and the like) based on the user's system account and associated service level. For example, data collector 116, via I/O interface(s) 114, may create one or more communication links with the external data entities. In some examples, data collector 116 may also determine any information such as security, data formatting, data type, normalization and the like, which may be useful for collecting, unifying, extracting and aggregating external data, including data from multiple independent external data accounts. In some examples, the linking to external data entity(s) may include one or more authentication techniques.

At step 510, ALAM server 102 may determine packaged data to be created that is specific to the user, and that is based on behavioral activity of the user. The data to be packaged may be initially determined by providing one or more interactive elements on interactive GUI 128 for user input (e.g., one or more of steps 510-1 through 510-5). In some examples, the interactive elements that may be presented may be based on the accessible service level accessible by the user (step 506).

As part of determining the packaged data, interactive GUI 128 may present an interactive element for adding at least one credit card (or other payment account) associated with the user (step 510-1). Interactive GUI 128 may also present an interactive element for adding account information of at least one external account (e.g., electronic account(s) 110) associated with the user (step 510-2). In some examples, the interactive element (in step 510-2) may permit the user to assign one or more accounts for payment of various transactions (e.g., periodic transactions such as for utilities, credit cards, etc.).

Interactive GUI 128 may also present an interactive element for permissioning of transaction bundling and/or loan creation (step 510-3). For example, the interactive element may present one or more transactions, and may provide the ability to sort the transactions. The interactive element may also create one or more bundles for the transactions. In some examples, the bundling may be automatically suggested by interactive GUI 128 and/or selected by the user via user input and/or a combination thereof. The interactive element may also provide one or more pricing and/or term options for payment of the transactions. The interactive element may also provide the ability to schedule payment(s) for the transaction(s) (e.g., autopay, one time pay and the like). In some examples, the scheduling may be automatically suggested by interactive GUI 128, may be selected by the user via user input and/or a combination thereof.

In some examples, the interactive element (in step 510-3) may automatically suggest the creation of one or more loan products based on the user's transactions. For example, the interactive element may suggest creation of a loan with an internal entity system associated with ALAM server 102 and/or an external entity. For example, based on the bundled transactions, and in some examples, other information (e.g., current interest rates associated with the internal and/or external entity systems, historical, current and predicted behavioral activity of the user, a user's desired buffer and the like), the interactive element may suggest creating and issuing a (virtual) line of credit product. The line of credit product may allow the user to move large (e.g., high priced) transactions or bundle a number of smaller transactions to the line of credit, and create a transaction on the line of credit. Interactive GUI 128 may further provide real-time updates and management of the bundled transactions and/or loans.

Interactive GUI 128 may also present an interactive element to permit the issuance of one or more virtual cards and any virtual wallet provisioning (step 510-4). Interactive GUI 128 may also present an interactive element to permission creation of at least one virtual wallet (step 510-5).

At step 512, ALAM server 102 may generate graphic dashboard 130 on interactive GUI 128 with packaged data customized for the user. The packaged data may be determined based on user input in one or more of steps 510-1 through 510-5), as well as user information (e.g., user profile, behavioral activity, etc.), account information, other external data (in some examples) and the like. The packaged data on graphic dashboard 130 may include one or more of indicators, statistics, alerts, product offers, optimization, analysis, insights, predictions, rewards, recommendations, other product offers, user service support and the like. In some examples, the graphic dashboard 130 may provide user-customized management of multiple independent accounts (including transaction accounts) that may provide a personalized buffer (e.g., among all of the user's accounts), personalized reporting, personalized real-time contextual communications/alerts, and personalized recommendations targeted to the user (based on account information and the user's past, current and predicted behavioral activity).

At step 514, graphic dashboard 130 may be dynamically updated (e.g., in real-time and/or near real-time) with changes in data (e.g., user input, changes in user profile(s) 136, data profile(s) 142, account information, transaction updates, changes in other data and the like).

FIG. 6 illustrates an exemplary interactive GUI 604 which may be provided on display interface 602 of user device 600. In some examples, interactive GUI 604 may be presented on a webpage and/or application accessed by a user of user device 600. Interactive GUI 604 illustrates an example interface for user-customized transaction account management that may take into account behavioral activity of the user (including predicted behavioral activity). It should be understood that FIG. 6 represents a non-limiting example user interface, and that a differing interface configured in accordance with this disclosure may be provided for providing user-customized management for any type of data account.

Interactive GUI 604 may include graphic dashboard 606 configured to generate user-customized packaged data that may take into account the user's behavioral activity as well any changes in data/information (including real-time and/or near-real-time changes that may be associated with the user in some manner and/or independent of the user). In general, the packaged data in graphic dashboard 606 may include information specific to the user that may be useful for managing the user's data accounts.

In a non-limiting example, graphic dashboard 606 may include one or more user input region(s) 608, dynamic user profile region 610, dynamic data profile region 612, notification(s)/suggestions region 614, virtual card/virtual account information region 616, external account information region 618, benchmarking data region 620 and/or option(s) region 622. It is understood that one or more of regions 610-622 may be interactive with the user (e.g., allowing user input as well as displaying information). It is also understood that user input region(s) 608 may be incorporated into any of regions 610-622 and/or may be a separate region on graphic dashboard 606. In some examples, user selection within one or more of regions 608-622 (e.g., a user click, hovering over a portion with a mouse, etc.) may cause graphic dashboard to provide additional information (e.g., a sub-window with additional information) and/or may present a new window with additional information (which window may also be interactive in some examples).

User input region(s) 608 may include any type of user input means for obtaining user input, including, for example, text boxes, check buttons, radio buttons, drop down options lists, menu buttons, spinners, voice commands, and the like. User input region(s) 608 may be used, for example, to log into graphic dashboard 606, provide/update user information, provide/update account information, provide/update user preferences, respond to any notifications and/or selections and/or provide any feedback for the management of the user's transaction accounts.

Dynamic user profile region 610 may present the user profile of the user. The user profile may be dynamically updated based on any updates (including in real-time and/or near real-time) in the behavioral activity of the user (including predicted behavioral activity). The user profile may be presented as a graphic representation, as a text representation and/or as an interactive representation.

Dynamic data profile region 612 may present one or more data profiles of other data that may be at least partially associated with and/or independent of the user (e.g., any data that may be useful to the user but may not necessarily depend directly upon the user). For example, a data profile may provide an aggregated summary of electronic market data that may be of interest to the user. The data profile(s) may be dynamically updated based on any changes in the data as monitored (including changes in real-time and/or near real-time). The data profile(s) may be presented as a graphic representation, as a text representation and/or as an interactive representation.

Notification(s)/suggestions region 614 may present one or more notifications (e.g., alerts, actions, etc.) and/or suggestions (e.g., account advice) and the like for managing the user's accounts. In some examples, notification(s) may also be transmitted to user device 600 as a data communication. In some examples, notification(s) may also be provided as an audible indication. In general, notification(s)/suggestions may be presented as a graphical representation, an audio representation, a text representation and/or as an interactive representation. In some examples, a notification/suggestion may include one or more prompts for user input, where the user input may then update information in region 614.

Virtual card/account information region 616 may present information of one or more virtual cards and/or one or more virtual accounts (e.g., cards/accounts that are internally managed such as ALAM server 102 shown in FIG. 1). The virtual card/account information may be dynamically updated based on any changes (including in real-time and/or near real-time) in the virtual card/account information as monitored. The virtual card/account information may be presented as a graphic representation, as a text representation and/or as an interactive representation.

External account information region 618 may present information of one or more external accounts (e.g., electronic accounts 110 shown in FIG. 1). The external account information may be dynamically updated based on any changes (including in real-time and/or near real-time) in the account information as monitored. The account information may be presented as a graphic representation, as a text representation and/or as an interactive representation. In some examples, region 618 may present an aggregated representation of the external account information, so that information across multiple external accounts may be presented together (as opposed to parsing the information across multiple windows and/or screens). In some examples, regions 616 and 618 may be combined into one region, to provide an aggregated presentation of account information across all internal and external accounts. In some examples, region 616, region 618 and/or a combined region including aggregated internal and external account information may provide one or more user input prompts for modifying an allocation of data among the internal and/or external accounts.

Benchmarking data region 620 may present benchmarking data that may be useful for managing the user's internal and/or external accounts. The benchmarking data may include one or more predetermined benchmarks (e.g., values, conditions, interest rates, goals, desired outputs and the like) that may be set by the system itself (e.g., ALAM server 102 of FIG. 1) and/or may be set by the user. The benchmarking data may be dynamically updated based on any changes in associated data as monitored (including changes in real-time and/or near real-time). The benchmarking data may be presented as a graphic representation, as a text representation and/or as an interactive representation.

Option(s) region 622 may present options for one or more services, rewards and/or products, including services/rewards/products provided by an entity system of interactive GUI 604 and/or one or more external entity systems. In some examples, the service/product options may include products and/or rewards by the entity system for different service levels. The service/product option(s) may be presented as a graphic representation, as a text representation and/or as an interactive representation (including, in some examples one or more hyperlinks).

Although exemplary regions are depicted in FIG. 6, alternate configurations for the regions are envisioned. For example, a graphical user interface may contain more or fewer regions. Additionally, the regions may be reorganized in any manner and display other pertinent information.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile communication devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 7:
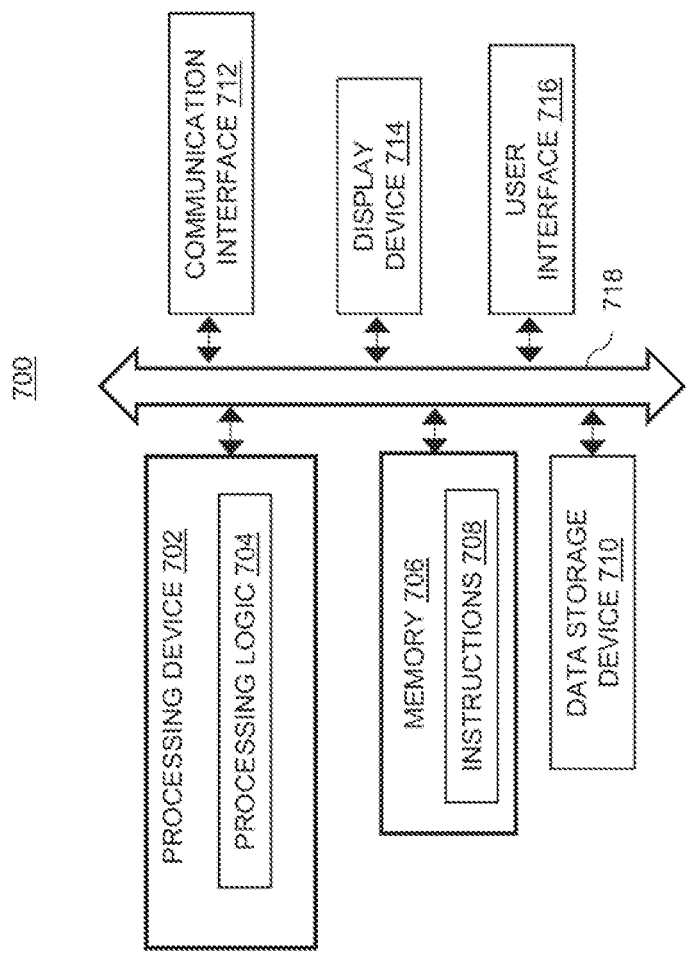
FIG. 7 is a functional block diagram of an example computer system according to an aspect of the present disclosure.

FIG. 7 illustrates a functional block diagram of a machine in the example form of computer system 700 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 114-134 of ALAM server 102, information system(s) 104 and/or user device(s) 106 may be implemented by a specialized machine, particularly programmed to perform certain functions, such as the example machine shown in FIG. 7 (or a combination of two or more of such machines).

Example computer system 700 may include processing device 702, memory 706, data storage device 710 and communication interface 712, which may communicate with each other via data and control bus 718. In some examples, computer system 700 may also include display device 714 and/or user interface 716.

Processing device 702 may include, without being limited to, a microprocessor, a central processing unit, an application-specific integrated circuit (ASIC), a field programmable gate array (FPGA), a digital signal processor (DSP) and/or a network processor. Processing device 702 may be configured to execute processing logic 704 for performing the operations described herein. Processing device 702 may include a special-purpose processing device specially programmed with processing logic 704 to perform the operations described herein.

Memory 706 may include, for example, without being limited to, at least one of a read-only memory (ROM), a random-access memory (RAM), a flash memory, a dynamic RAM (DRAM) and a static RAM (SRAM), storing computer-readable instructions 708 executable by processing device 702. Memory 706 may include a non-transitory computer readable storage medium storing computer-readable instructions 708 executable by processing device 702 for performing the operations described herein. For example, computer-readable instructions 708 may include operations performed by components 114-134 of ALAM server 102, including operations shown in FIGS. 4 and 5. Although one memory device 706 is illustrated in FIG. 7, in some examples, computer system 700 may include two or more memory devices (e.g., dynamic memory and static memory).

Computer system 700 may include communication interface device 712, for direct communication with other computers (including wired and/or wireless communication) and/or for communication with a network. In some examples, computer system 700 may include display device 714 (e.g., a liquid crystal display (LCD), a touch sensitive display, etc.). In some examples, computer system 700 may include user interface 716 (e.g., an alphanumeric input device, a cursor control device, etc.).

In some examples, computer system 700 may include data storage device 710 storing instructions (e.g., software) for performing any one or more of the functions described herein. Data storage device 710 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
one or more information source systems;
a user device associated with a user;
one or more electronic data accounts associated with the user; and
a server in communication with the one or more information source systems via at least one network, the user device and the one or more electronic data accounts, the server comprising an interactive graphical user interface (GUI), the server configured to:
link the one or more electronic data accounts,
monitor transactional data among the one or more information source systems and the linked accounts for any changes in spending activity associated with the user,
generate a user specific prediction model for the user by:
identifying historical activity of the user from the one or more linked electronic data accounts,
identifying further historical activity of other users with similar demographics to the user,
learning, by the user specific prediction model, financial activity patterns and behavior of the user based at least on the historical activity of the user, and
learning, by the user specific prediction model, further financial activity patterns and further behavior of the other users based on the further historical activity of the other users;
predict, via the user specific prediction model, a behavioral activity of the user based on at least one of the monitored transactional data and historical transactional data associated with the user, the predicted behavioral activity including one or more predicted problems and deficiencies in at least one among the linked accounts associated with the user,
analyze, via the user specific prediction model, the activity patterns of both the user and the other users,
generate at least one notification instruction specific to the user based on the predicted behavioral activity and the analyzed activity patterns, the at least one notification instruction including at least one of an alert and a suggestion, the suggestion identifying one or more system features and functions configured for avoiding at least one among the one or more predicted problems and deficiencies,
unlock at least one among the one or more system features and functions,
generate the interactive GUI for display on the user device, the interactive GUI presenting one or more of the at least one notification instruction and a user profile of the user among the linked accounts, and
dynamically update the interactive GUI to reflect real-time changes in at least one of the at least one notification instruction, the monitored transactional data, the user profile and the predicted behavioral activity.

2. The system of claim 1, wherein the notification instruction includes the alert and at least one suggested action specific to the user.

3. The system of claim 2, wherein the server transmits the notification instruction to the user device over the at least one network as a data communication.

4. The system of claim 1, wherein the one or more information source systems includes at least one of a point-of-sale (POS) system, a service provider, a financial institution system, a business entity system, a government entity system, a credit agency system and at least one other user device.

5. The system of claim 1, wherein the system further comprises at least one virtual wallet associated with the user, the server configured to communicate with the at least one virtual wallet.

6. The system of claim 1, wherein the server is further configured to create at least one of a virtual card and a virtual account associated with the user.

7. The system of claim 1, wherein the server is further configured to generate a data profile based on monitoring additional data among the one or more information source systems and the linked accounts and dynamically update the data profile in accordance with changes in the monitored additional data.

8. The system of claim 1, wherein the server is configured to generate the user profile based on information comprising one or more of user information, account information, historical user behavioral activity, current user behavioral activity and the predicted behavioral activity.

9. The system of claim 8, wherein the server is configured to dynamically updated the user profile based on changes in said information.

10. The system of claim 1, wherein the server is configured to package data among one or more of the linked accounts, the monitored transactional data, the at least one notification instruction and the user profile, such that the packaged data is customized to the user.

11. The system of claim 10, wherein the packaged data further includes one or more of a personalized notice, personalized insights associated with at least one of user activity and spending habits, a product offering, a suggestion based on information associated with the user, a suggestion based on one or more other users with a similar profile, a prediction, a reward, benchmarking data, a service option, user support and pricing information.

12. The system of claim 1, wherein the server includes a training element for training the user specific prediction model on one or more of at least one pattern and at least one behavioral activity specific to the user.

13. The system of claim 1, wherein the interactive GUI includes an interactive element for bundling one or more transactions to generate a stable flow of the electronic funds across the linked accounts.

14. The system of claim 13, wherein the interactive element further includes a component for creating a virtual line of credit, based on the one or more transactions associated with the user.

15. The system of claim 1, wherein the server is further configured to at least one of unify, parse and aggregate the data, prior to said monitor of the transactional data.

16. A method comprising:
linking, by a server in communication with one or more information source systems via at least one network, one or more electronic data accounts associated with a user, the user being associated with a user device;
monitoring, by the server, transactional data among the one or more information source systems and the linked accounts for any changes in spending activity associated with the user;
generating a user specific prediction model for the user by:
identifying historical activity of the user from the one or more linked electronic data accounts,
identifying further historical activity of other users with similar demographics to the user,
learning, by the user specific prediction model, financial activity patterns and behavior of the user based at least on the historical activity of the user, and
learning, by the user specific prediction model, further financial activity patterns and further behavior of the other users based on the further historical activity of the other users;
predicting, via the user specific prediction model, a behavioral activity of the user based on at least one of the monitored transactional data and historical transactional data associated with the user, the predicted behavioral activity including one or more predicted problems and deficiencies in at least one among the linked accounts associated with the user;
analyzing, via the user specific prediction model, the activity patterns of both the user and the other users,
generating, by the server, at least one notification instruction specific to the user based on the predicted behavioral activity and the analyzed activity patterns, the at least one notification instruction including at least one of an alert and a suggestion, the suggestion identifying one or more system features and functions configured for avoiding at least one among the one or more predicted problems and deficiencies;
unlocking, by the server, at least one among the one or more system features and functions;
generating, by the server, an interactive graphical user interface (GUI) for display on the user device, the interactive GUI presenting one or more of the at least one notification instruction and a user profile of the user among the linked accounts; and
dynamically updating, by the server, the interactive GUI to reflect real-time changes in at least one of the at least one notification instruction, the monitored transactional data, the user profile and the predicted behavioral activity.

17. The method of claim 16, wherein the notification instruction includes the alert and at least one suggested action specific to the user.

18. The method of claim 17, the method further comprising:
transmitting, by the server, the notification instruction to the user device over the at least one network as a data communication.

19. The method of claim 16, the method further comprising:
communicating, by the server, with at least one virtual wallet associated with the user.

20. The method of claim 16, the method further comprising:
creating, by the server, at least one of a virtual card and a virtual account associated with the user.

21. The method of claim 16, the method further comprising:
generating, by the server, a data profile based on monitoring additional data among the one or more information source systems and the linked accounts; and
dynamically updating the data profile in accordance with changes in the monitored additional data.

22. The method of claim 16, the method further comprising:
generating, by the server, the user profile based on information comprising one or more of user information, account information, historical user behavioral activity, current user behavioral activity and the predicted behavioral activity; and
dynamically updating the user profile based on changes in said information.

23. The method of claim 16, the method further comprising:
packaging, by the server, data among one or more of the linked accounts, the monitored transactional data, the at least one notification instruction and the user profile, such that the packaged data is customized to the user.

24. The method of claim 23, wherein the packaged data further includes one or more of a personalized notice, personalized insights associated with at least one of user activity and spending habits, a product offering, a suggestion based on information associated with the user, a suggestion based on one or more other users with a similar profile, a prediction, a reward, benchmarking data, a service option, user support and pricing information.

25. The method of claim 16, the method further comprising:
training, by a training element of the server, the user specific prediction model on one or more of at least one pattern and at least one behavioral activity specific to the user.

26. The method of claim 16, the method further comprising:
generating the interactive GUI such that the interactive GUI includes an interactive element for bundling one or more transactions to generate a stable flow of the electronic funds across the linked accounts.

27. The method of claim 26, the method further comprising:
providing, by the interactive element, a component for creating a virtual line of credit, based on the one or more transactions associated with the user.

28. A non-transitory computer readable medium storing computer readable instructions that, when executed by one or more processing devices, cause the one or more processing devices to perform operations comprising:
linking, across at least one network, one or more electronic data accounts associated with a user;
monitoring, via the at least one network, transactional data from among one or more information source systems and the linked accounts for any changes in spending activity associated with the user;
generate a user specific prediction model for the user by:
identifying historical activity of the user from the one or more linked electronic data accounts,
identifying further historical activity of other users with similar demographics to the user,
learning, by the user specific prediction model, financial activity patterns and behavior of the user based at least on the historical activity of the user, and
learning, by the user specific prediction model, further financial activity patterns and further behavior of the other users based on the further historical activity of the other users;
predicting, via the user specific prediction model, a behavioral activity of the user based on at least one of the monitored transactional data and historical transactional data associated with the user, the predicted behavioral activity including one or more predicted problems and deficiencies in at least one among the linked accounts associated with the user;
analyzing, via the user specific prediction model, the activity patterns of both the user and the other users;
generating at least one notification instruction specific to the user based on the predicted behavioral activity and the analyzed activity patterns, the at least one notification instruction including at least one of an alert and a suggestion, the suggestion identifying one or more system features and functions configured for avoiding at least one among the one or more predicted problems and deficiencies;
unlocking at least one among the one or more system features and functions;
generating an interactive graphical user interface (GUI) for display on user device associated with the user, the interactive GUI presenting one or more of the at least one notification instruction and a user profile of the user among the linked accounts; and
dynamically updating the interactive GUI to reflect real-time changes in at least one of the at least one notification instruction, the monitored transactional data, the user profile and the predicted behavioral activity.

29. The non-transitory computer readable medium of claim 28, wherein the notification instruction includes the alert and at least one suggested action specific to the user.

30. The non-transitory computer readable medium of claim 28, wherein computer readable instructions, when executed by one or more processing devices, further cause the one or more processing devices to perform operations comprising:
packaging data among one or more of the linked accounts, the monitored transactional data, the at least one notification instruction and the user profile, such that the packaged data is customized to the user.

* * * * *